United States Patent
Svendsen et al.

(10) Patent No.: US 8,548,855 B2
(45) Date of Patent: Oct. 1, 2013

(54) USER GENERATED ADS BASED ON CHECK-INS

(75) Inventors: Hugh Svendsen, Chapel Hill, NC (US); John Forese, Atherton, CA (US); Christopher M. Amidon, Apex, NC (US); Kunal Kandekar, Jersey City, NJ (US); Eugene Matthew Farrelly, Cary, NC (US)

(73) Assignee: Teaneck Enterprises, LLC, Portsmouth, NH (US)

( * ) Notice: Subject to any disclaimer, the term of this patent is extended or adjusted under 35 U.S.C. 154(b) by 153 days.

(21) Appl. No.: 13/085,853

(22) Filed: Apr. 13, 2011

(65) Prior Publication Data

US 2012/0123875 A1    May 17, 2012

Related U.S. Application Data

(60) Provisional application No. 61/412,584, filed on Nov. 11, 2010.

(51) Int. Cl.
  *G06Q 30/00*   (2012.01)
(52) U.S. Cl.
  USPC .............. 705/14.67; 705/14.49; 705/14.72; 705/14.73
(58) Field of Classification Search
  USPC ................................. 705/14.67
  See application file for complete search history.

(56) References Cited

U.S. PATENT DOCUMENTS

| | | | |
|---|---|---|---|
| 4,581,634 A * | 4/1986 | Williams | 348/156 |
| 4,975,690 A | 12/1990 | Torres | |
| 5,072,412 A | 12/1991 | Henderson, Jr. et al. | |
| 5,493,692 A | 2/1996 | Theimer et al. | |
| 5,713,073 A | 1/1998 | Warsta | |
| 5,754,939 A | 5/1998 | Herz et al. | |
| 6,014,090 A | 1/2000 | Rosen et al. | |
| 6,049,711 A | 4/2000 | Ben-Yehezkel et al. | |
| 6,285,381 B1 * | 9/2001 | Sawano et al. | 715/726 |
| 6,349,203 B1 | 2/2002 | Asaoka et al. | |
| 6,446,004 B1 | 9/2002 | Cao et al. | |

(Continued)

FOREIGN PATENT DOCUMENTS

| | | |
|---|---|---|
| EP | 2051480 A1 | 4/2009 |
| EP | 2151797 A1 | 2/2010 |

(Continued)

OTHER PUBLICATIONS

Siegler, "Photocheck.in: A Picture is Worth 1,000 Foursquare Check-Ins. Or At Least One.", TechCrunch, Jan. 4, 2010, found on line at techcrunch.com/2010/01/04/photocheckin-foursquare-pictures.*

(Continued)

*Primary Examiner* — John G Weiss
*Assistant Examiner* — Scott C Anderson

(57) ABSTRACT

Systems and methods are disclosed for generating and utilizing photo advertisements ("ads"). In one embodiment, a photo check-in process is performed for a user located within a geographic check-in zone which results in a photo advertisement that is utilized as a photo check-in for the user. In another embodiment, a photo advertisement is posted as a status update for a user via a social networking service. In another embodiment, photo advertisements are created by users and stored for subsequent use in serving ad requests.

35 Claims, 19 Drawing Sheets

(56) References Cited

U.S. PATENT DOCUMENTS

| | | |
|---|---|---|
| 6,456,852 B2 | 9/2002 | Bar et al. |
| 6,542,749 B2 | 4/2003 | Tanaka et al. |
| 6,549,768 B1 | 4/2003 | Fraccaroli |
| 6,618,593 B1 | 9/2003 | Drutman et al. |
| 6,658,095 B1 | 12/2003 | Yoakum et al. |
| 6,668,173 B2 | 12/2003 | Greene |
| 6,700,506 B1 | 3/2004 | Winkler et al. |
| 6,970,088 B2 | 11/2005 | Kovach |
| 7,085,571 B2 | 8/2006 | Kalhan et al. |
| 7,110,744 B2 | 9/2006 | Freeny, Jr. |
| 7,206,568 B2 | 4/2007 | Sudit |
| 7,227,937 B1 | 6/2007 | Yoakum et al. |
| 7,269,426 B2 | 9/2007 | Kokkonen et al. |
| 7,315,823 B2 | 1/2008 | Brondrup |
| 7,394,345 B1 | 7/2008 | Ehlinger et al. |
| 7,423,580 B2 | 9/2008 | Markhovsky et al. |
| 7,512,649 B2 | 3/2009 | Faybishenko et al. |
| 7,607,096 B2 | 10/2009 | Oreizy et al. |
| 7,668,537 B2 | 2/2010 | De Vries |
| 7,770,137 B2 | 8/2010 | Forbes et al. |
| 7,779,444 B2 | 8/2010 | Glad |
| 7,787,886 B2 | 8/2010 | Markhovsky et al. |
| 7,796,946 B2 | 9/2010 | Eisenbach |
| 7,801,954 B2 | 9/2010 | Cadiz et al. |
| 8,208,943 B2 | 6/2012 | Petersen et al. |
| 2003/0023874 A1* | 1/2003 | Prokupets et al. ............ 713/201 |
| 2004/0158739 A1 | 8/2004 | Wakai et al. |
| 2004/0189465 A1 | 9/2004 | Capobianco et al. |
| 2006/0119882 A1 | 6/2006 | Harris et al. |
| 2006/0242239 A1 | 10/2006 | Morishima et al. |
| 2006/0287878 A1 | 12/2006 | Wadhwa et al. |
| 2007/0004426 A1 | 1/2007 | Pfleging et al. |
| 2007/0075898 A1 | 4/2007 | Markhovsky et al. |
| 2007/0136228 A1 | 6/2007 | Petersen |
| 2007/0210936 A1 | 9/2007 | Nicholson |
| 2007/0214180 A1 | 9/2007 | Crawford |
| 2007/0233859 A1 | 10/2007 | Zhao et al. |
| 2008/0022329 A1 | 1/2008 | Glad |
| 2008/0032703 A1 | 2/2008 | Krumm et al. |
| 2008/0043041 A2 | 2/2008 | Hedenstroem et al. |
| 2008/0076505 A1 | 3/2008 | Nguyen et al. |
| 2008/0092233 A1 | 4/2008 | Tian et al. |
| 2008/0120409 A1 | 5/2008 | Sun et al. |
| 2008/0158230 A1 | 7/2008 | Sharma et al. |
| 2008/0168489 A1 | 7/2008 | Schraga |
| 2008/0288338 A1 | 11/2008 | Wiseman et al. |
| 2008/0306826 A1 | 12/2008 | Kramer et al. |
| 2008/0313329 A1 | 12/2008 | Wang et al. |
| 2009/0030999 A1 | 1/2009 | Gatzke et al. |
| 2009/0093261 A1 | 4/2009 | Ziskind et al. |
| 2009/0199242 A1 | 8/2009 | Johnson et al. |
| 2009/0215469 A1 | 8/2009 | Fisher et al. |
| 2009/0239552 A1 | 9/2009 | Churchill et al. |
| 2009/0291672 A1 | 11/2009 | Treves et al. |
| 2009/0319607 A1 | 12/2009 | Belz et al. |
| 2009/0327073 A1 | 12/2009 | Li et al. |
| 2010/0062794 A1 | 3/2010 | Han |
| 2010/0082427 A1 | 4/2010 | Burgener et al. |
| 2010/0113065 A1 | 5/2010 | Narayan et al. |
| 2010/0130233 A1 | 5/2010 | Parker |
| 2010/0153144 A1 | 6/2010 | Miller et al. |
| 2010/0162149 A1 | 6/2010 | Sheleheda et al. |
| 2010/0185552 A1 | 7/2010 | DeLuca et al. |
| 2010/0197318 A1 | 8/2010 | Petersen et al. |
| 2010/0197319 A1 | 8/2010 | Petersen et al. |
| 2010/0198683 A1 | 8/2010 | Aarabi |
| 2010/0198826 A1 | 8/2010 | Petersen et al. |
| 2010/0198828 A1 | 8/2010 | Petersen et al. |
| 2010/0198862 A1 | 8/2010 | Jennings et al. |
| 2010/0198870 A1 | 8/2010 | Petersen et al. |
| 2010/0198917 A1 | 8/2010 | Petersen et al. |
| 2010/0201482 A1 | 8/2010 | Robertson et al. |
| 2010/0201536 A1 | 8/2010 | Robertson et al. |
| 2010/0259386 A1 | 10/2010 | Holley et al. |
| 2010/0273509 A1 | 10/2010 | Sweeney et al. |
| 2012/0123830 A1 | 5/2012 | Svendsen et al. |
| 2012/0123871 A1 | 5/2012 | Svendsen et al. |
| 2012/0124176 A1 | 5/2012 | Curtis et al. |
| 2012/0252418 A1 | 10/2012 | Kandekar et al. |

FOREIGN PATENT DOCUMENTS

| | | |
|---|---|---|
| GB | 2399928 A | 9/2004 |
| WO | 2006/118755 A2 | 11/2006 |
| WO | 2007/092668 A2 | 8/2007 |
| WO | 2009/043020 A2 | 4/2009 |

OTHER PUBLICATIONS

MakeUseOf, "Yearbook Yourself", MakeUseOf, Aug. 18, 2008, found on line at makeuseof.com.*

Ossi, "This week's site: YearbookYourself.com", McClatchy—Tribune News Service [Washington], Sep. 10, 2008.*

Casssidy, "NFC Forum Global Competition Announces Winners", NFC Forum, Apr. 24, 2009.*

DeGeer, "Analyzing your Audience", lecture notes from CATA 339 (Persuasion Ethics Cases), Monmouth College, Feb. 2, 2003, on line at department.monm.edu/cata/mcgaan/classes/cata339/audience-analysis101.htm.*

Choney, "Phone to speakers: Play tunes, and I mean now", NBC News, Apr. 23, 2008, on line at nbcnews.com/id/24246254.*

Choney, Suzanne, "Mobile services mushroom for locating friends," Aug. 14, 2008, copyright 2008, MSNBC.com, 1 page.

Cox, L.P. et al., "Presence-Exchanges: Toward Sustainable Presence-Sharing," In Proc. of 7th IEEE Workshop on Mobile Computing Systems and Applications, Apr. 6-7, 2006, Semiahmoo Resort, Washington, pp. 55-60, 6 pages.

"dodgeball.com :: mobile social software," at <http://www.dodgeball.com/>, copyright 2008, Google Inc., printed Jan. 16, 2008, 1 page.

"Face in Hole", at <http://www.mahalo.com/face-in-hole>, states that the website debuted in Mar. 2008, copyright 2007-2010, Mahalo.com Incorporated, printed Oct. 26, 2010, 4 pages.

"Fire Eagle : What is Fire Eagle?", found at <http://fireeagle.yahoo.net/help> on the Internet Archive, dated Jul. 9, 2011, copyright 2007-2011, Yahoo! Inc., printed Nov. 10, 2011, 4 pages.

Ha, Anthony, "Shopkick's mobile shopping app tracks you in stores, delivers real-time deals," Aug. 3, 2010, found at <http://venturebeat.com/2010/08103/shopkick-best-buy/>, printed Nov. 10, 2011, 6 pages.

"Late problem solved: first GPS based notification for Mobile phones goes online," Jul. 3, 2007, copyright 2006-2007, Office Assitance LLC, at <http://www.office-outlook.com/outlook-news/late-problem-solved-fir...>, originally published Jul. 2, 2007, PR Newsire Association LLC, at <http://www.prnewswire.com/news-releases/late-problem-solved-first-gps-based-notification-for-mobile-phones-goes-online-52696107.html>, 1 page.

Li, N. et al., "Analysis of a Location-based Social Network," IEEE International Conference on Computa-tional Science and Engineering, Symposium on Social Intelligence and Networking, Aug. 29-31, 2009, vol. 4, IEEE Computer Society, Los Alamitos, California, pp. 263-270, article found at <http://www.cs.uml.edu/~glchen/papers/brightkite-sin09.pdf>, 8 pages.

Murph, D., "GPS notification software informs managers of your tardiness," posted Jul. 2, 2007, copyright 2003-2007, Weblogs, Inc., found at <http://www.engadget.com/2007/07/02/gps-notification-service-infor...>, printed Sep. 24, 2007, 5 pages.

Perez, Sarah, "How to Hack Nike+ for Automatic Foursquare Check-ins," Sep. 3, 2010, found at <http://www.readwriteweb.com/archives/how_to_hack_nike_for_automatic_foursquare_check-ins.php>, printed Mar. 10, 2011, 4 pages.

Perkins, S., "Foursquare Testing NFC, Adds Merchant Rewards," Mar. 10, 2011, found at <http://www.slashgear.com/foursquare-testing-nfc-adds-merchant-rewards-10139249/#, copyright 2006-2011, SlashGear, printed Mar. 11, 2011, 8 pages.

Stumble!to, "About stumble!to," found at <http://stumble.to/about> on the Internet Archive, dated Sep. 21, 2010, printed Nov. 10, 2011, 1 page.

Siegler, MG, "Check-In on Foursquare Without Taking Your Phone Out of Your Pocket," Aug. 2, 2010, found at <http://techcrunch.com/2010/08102/future-checkin/#>, copyright 2011, TechCrunch, printed Mar. 10, 2011, 10 pages.

Catania, "Are Concert Fans and Music Venues Using Foursquare?" christophercatania.com, May 4, 2010, found online at christophercatania.com/2010/05/04/are-concert-fans-and-musicvenues-using-foursquare/.

* cited by examiner

USER GENERATED ADS BASED ON CHECK-INS

RELATED APPLICATIONS

This application claims the benefit of provisional patent application Ser. No. 61/412,584, filed Nov. 11, 2010, the disclosure of which is Hereby incorporated by reference in its entirety.

This application is related to U.S. patent application Ser. No. 13/085,869, entitled USER GENERATED PHOTO ADS USED AS STATUS UPDATES, which was filed Apr. 13, 2011; and U.S. patent application Ser. No. 13/085,886, entitled SERVING AD REQUESTS USING USER GENERATED PHOTO ADS, which was filed Apr. 13, 2011; both of which are commonly owned and assigned and are hereby incorporated herein by reference in their entireties.

FIELD OF THE DISCLOSURE

The present disclosure relates to user generated advertisements.

BACKGROUND

Check-in services, such as the FourSquare™ check-in service, allow users to announce their presence at Points of Interest (POIs) such as business establishments. Further, other services, such as some social networking services, are starting to provide similar check-in features. There is a need and a desire to utilize check-ins of users in a manner that advertises the corresponding POIs.

SUMMARY

Systems and methods are disclosed for generating and utilizing photo advertisements ("ads"). In one embodiment, a photo check-in process is performed for a user located within a geographic check-in zone which results in a photo advertisement that is utilized as a photo check-in for the user. More specifically, one or more photo ad templates that are applicable to the check-in zone are obtained, where each photo ad template includes one or more photo wells. A photo advertisement is then generated based on one of the photo ad templates such that a filler image of a different one of one or more participants identified for the photo advertisement is inserted into each of the one or more photo wells in the photo ad template. The photo advertisement is then used as a photo check-in for the user. In one embodiment, the photo advertisement is also used as a status update of the user. In another embodiment, the photo advertisement is stored and subsequently used to serve ad requests.

In another embodiment, a photo advertisement is posted as a status update for a user via a social networking service. More specifically, first, one or more photo ad templates are obtained for the user, where each photo ad template includes one or more photo wells. The one or more photo ad templates may be relevant to a geographic location of the user, a website that the user has visited, a website that the user has logged into, a product that the user has purchased, a service that the user has purchased, an event attended by the user, a viewing experience of the user (e.g., a video watched by the user or a series of videos watched by the user), a listening experience of the user (e.g., a song listened to by the user or an album listened to by the user), or the like. A photo advertisement is then generated based on one of the photo ad templates such that a filler image of a different one of one or more participants identified for the photo advertisement is inserted into each of the one or more photo wells in the photo ad template. The photo advertisement is then used as a status update for the user. In another embodiment, the photo advertisement is stored and subsequently used to serve ad requests.

In another embodiment, photo advertisements are created by users and stored for subsequent use in serving ad requests. More specifically, first, one or more photo ad templates are obtained for the user, where each photo ad template includes one or more photo wells. The one or more photo ad templates may be relevant to a geographic location of the user, a website that the user has visited, a website that the user has logged into, a product that the user has purchased, a service that the user has purchased, an event attended by the user, or the like. A photo advertisement is then generated based on one of the photo ad templates such that a filler image of a different one of one or more participants identified for the photo advertisement is inserted into each of the one or more photo wells in the photo ad template. The photo advertisement is then stored. This process is repeated such that numerous photo advertisements are stored. At some point, an ad request is received from a requestor. The requestor is preferably a website or web service such as, for example, a social networking service. In response, one or more of the photo advertisements that satisfy the ad request are selected and returned to the requestor.

In another embodiment, a computer server obtains and stores user-created photo advertisements. Each of the user-created photo advertisements is generated based on a corresponding photo ad template having one or more photo wells such that filler images of one or more participants are inserted into the one or more photo wells. For each user-created photo advertisement, the one or more participants include at least a user by which the photo advertisement was created. In addition, the computer server effects use of the stored user-created photo advertisements as sponsored advertisements.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Figure 1:
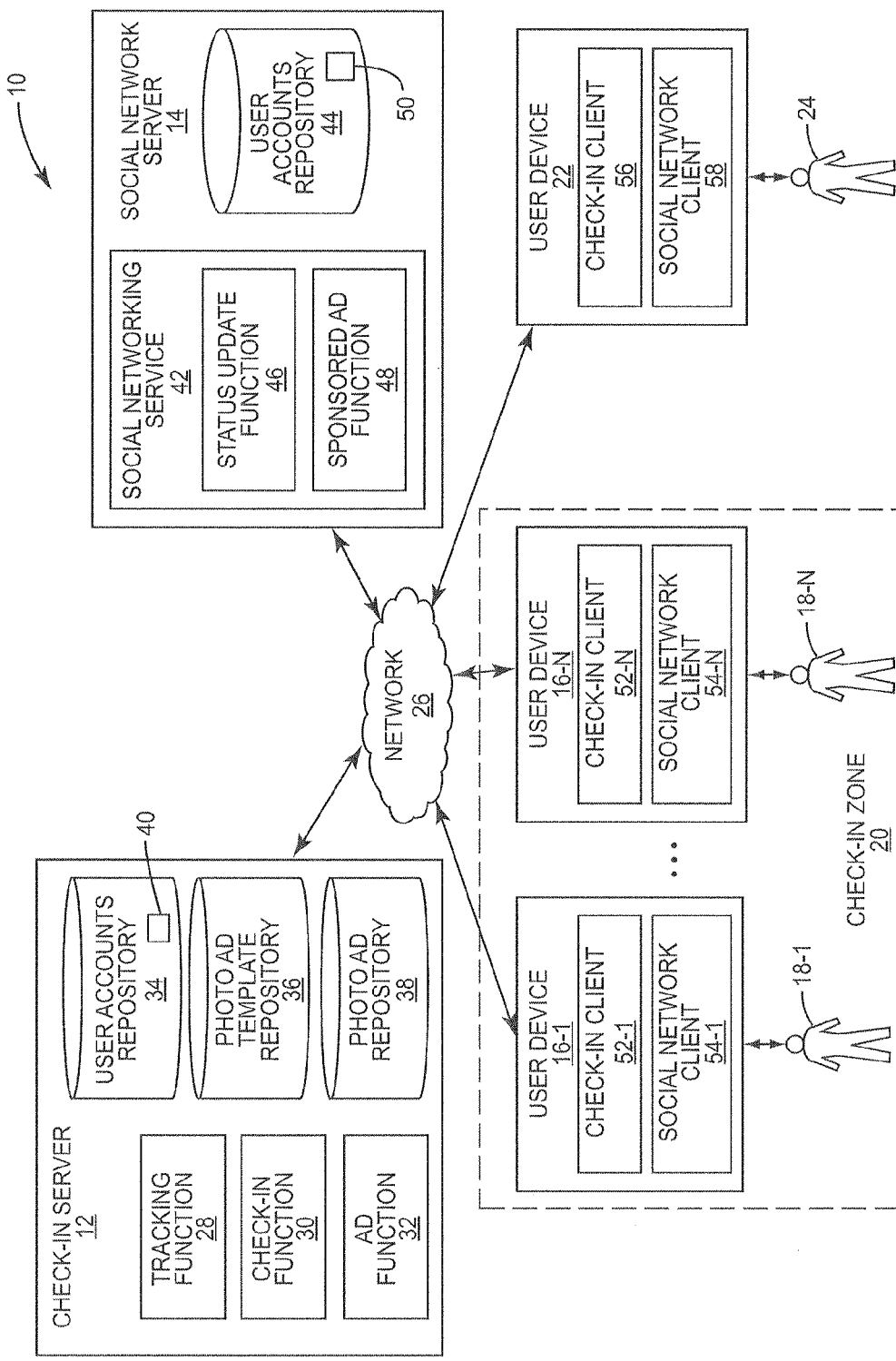
FIG. 1 illustrates a system for generating and utilizing user generated photo advertisements ("ads") according to one embodiment of the present disclosure.

FIG. 1 illustrates a system 10 that enables the generation and utilization of user-created photo advertisements ("ads") according to one embodiment of the present disclosure. The system 10 includes a check-in server 12, a social network server 14, a number of user devices 16-1 through 16-N (generally referred to herein collectively as user devices 16 and individually as user device 16) having associated users 18-1 through 18-N (generally referred to herein collectively as users 18 and individually as user 18) located within a check-in zone 20, and a user device 22 having an associated user 24 communicatively coupled via a network 26. The network 26 is generally any type of network suitable to allow interaction between the check-in server 12, the social network server 14, the user devices 16, and the user device 22. For example, the network 26 may be a Wide Area Network (WAN), a Local Area Network (LAN), or any combination thereof and may include wired and/or wireless components. Preferably, the network 26 is a distributed, public access network such as, for example, the Internet, where the check-in server 12, the social network server 14, the user devices 16, and the user device 22 are capable of connecting to the network 26 via wired and/or wireless connections. An exemplary wired connection to the network 26 is an Ethernet connection. Exemplary wireless connections are cellular communications connections (e.g., 3G or 4G cellular communications connections such as Global System for Mobile communications (GSM) connections, Code Division Multiple Access (CDMA) connections, Long Term Evolution (LTE) connections, or the like) and local wireless connections (e.g., IEEE 802.11x connections to IEEE 802.11x access points connected to the network 26). Further, various networking protocols may be used such as, for example, Transmission Control Protocol/Internet Protocol (TCP/IP), Hypertext Transport Protocol (HTTP), and File Transfer Protocol (FTP).

As illustrated, the check-in server 12 is a server computer. However, one of ordinary skill in the art will appreciate that the check-in server 12 may be implemented as multiple server computers operating in a distributed manner for purposes of load sharing and/or redundancy. Notably, the check-in server 12 is one type of advertisement server that may enable users to create photo ads according to the present disclosure. The check-in server 12 includes a tracking function 28, a check-in function 30, an ad function 32, a user accounts repository 34, a photo ad template repository 36, and a photo ad repository 38. The tracking function 28, the check-in function 30, and the ad function 32 are preferably implemented in software, but are not limited thereto. The tracking function 28 generally operates to track geographic locations of registered users of the check-in server 12 such as, but not limited to, the users 18 and 24. For example, the user devices 16 and 22 may report their geographic locations, and thus the geographic locations of the users 18 and 24, to the check-in server 12. Alternatively, the check-in server 12 may periodically poll the user devices 16 and 22 for the geographic locations of the users 18 and 24.

As discussed below in detail, the check-in function 30 operates to enable users, such as the users 18 and 24, to perform a simple check-in or a photo check-in. As used herein, a check-in is an announcement by a user that the user is currently located within a particular check-in zone. The check-in zone is preferably a geographic area that corresponds to boundaries of a Point of Interest (POI). As used herein, a POI is user-defined, system-defined, or either user-defined or system-defined depending on the particular implementation. In general, a POI is a specific location that someone may find useful or interesting. Some exemplary POIs are business establishments (e.g., restaurants, bars, gas stations, stores, or the like), sports arenas, schools, buildings, museums, historic landmarks, or the like. As used herein, a simple check-in is an announcement that the user is currently located within a particular check-in zone that is not in the form of a photo advertisement as described herein. As used herein, a photo check-in is an announcement that the user is currently located within a particular check-in zone in the form of a photo advertisement created from a corresponding photo ad template by inserting a filler image of the user and, in some embodiments, filler images of one or more additional participants into photo well(s) in the photo ad template.

As discussed below in detail, the ad function 32 enables users, such as the users 18 and 24, to create photo advertisements using photo ad templates stored in the photo ad template repository 36. In this embodiment, the photo advertisements are utilized as photo check-ins published by the check-in server 12. In addition or alternatively, the photo advertisements are provided to the social network server 14 as status updates of the corresponding users 18 and 24. Still further, the photo advertisements are stored in the photo ad repository 38 for subsequent use. More specifically, the ad function 32 may serve advertisement requests using the photo advertisements stored in the photo ad repository 38.

The user accounts repository 34 stores a user account 40 for each registered user of the check-in server 12. Here, the registered users of the check-in server 12 include, but are not limited to, the users 18 and 24. The user account 40 of each registered user includes user preferences of the registered user, social network credentials of the registered user, and/or the like. The photo ad template repository 36 includes a number of photo ad templates and associated metadata. Each photo ad template includes one or more photo wells into which filler images are to be inserted to provide photo advertisements. The metadata for the photo ad templates generally includes information that describes the photo ad templates. For example, for each of the photo ad templates, the metadata for the photo ad template may include information that defines a number of photo wells included in the photo ad template. In addition, if the photo wells are face knockouts for persons appearing in a picture included in the photo ad template, the metadata may include metadata for each face knockout that describes a class of users for which the face knockout is suitable. For example, the metadata for a face knockout may include a gender, an age or age range, ethnicity, and/or the like. In addition, in this embodiment, the metadata includes data that identifies one or more check-in zones, such as the check-in zone 20, to which the photo ad template is applicable. Notably, as discussed below, the present disclosure is not limited to generating photo advertisements based on check-in zones. As such, in other embodiments, the metadata may alternatively include data that identifies one or more geographic locations to which the photo ad template is applicable, one or more websites to which the photo ad template is applicable, one or more goods to which the photo ad template is applicable, one or more services to which the photo ad template is applicable, and/or the like.

The photo ad repository 38 stores a number of photo advertisements and associated metadata. The photo advertisements are photo advertisements created by the registered users of the check-in server 12 using the ad function 32. For each photo advertisement, the metadata for the photo advertisement generally includes data that describes applicability data and creation information. The applicability data, in this embodiment, describes the check-in zone to which the photo advertisement applies. The data that describes the check-in zone may include, for example, a name or identifier of a corresponding POI or a location of the corresponding POI. The creation information may include, for example, an identifier such as a Globally Unique Identifier (GUID) of the photo ad template from which the photo advertisement was created, a list of participants appearing in the photo advertisement such as a list of GUIDs of the participants appearing in the photo advertisement, Uniform Resource Indicators (URIs) for filler images to be inserted into the photo wells of the corresponding photo ad template to provide the photo advertisement, a maturity rating of the photo advertisement, and product placement data for the photo advertisement (e.g., data that identifies one or more products appearing in the photo advertisement). Still further, the metadata for the photo advertisement may include data that defines one or more restrictions placed on the use of the photo advertisement by the creator of the photo advertisement (i.e., the user 18 or 24 that created the photo advertisement). For example, the metadata may include information that defines a class of users to which the creator has agreed to allow the photo advertisement to be shown (e.g., only direct friends of the creator in the social network maintained by the social network server 14, other users within a defined degree of separation from the creator in the social network maintained by the social network server 14, other users located within a defined geographic distance from the creator, other users in the social network based on relationship type (e.g., "friend," "relative," or "colleague"), and/or the like). As another example, the metadata may include user-defined restrictions of a frequency of use of the photo advertisement (e.g., used as a sponsored advertisement no more than once an hour), an ad lifetime, a location restriction, a social distance restriction with respect to the creator of the photo advertisement, and/or the like.

As illustrated, the social network server 14 is a server computer. However, one of ordinary skill in the art will appreciate that the social network server 14 may be implemented as multiple server computers operating in a distributed manner for purposes of load sharing and/or redundancy. The social network server 14 includes a social networking service 42 and a user accounts repository 44. Notably, while the check-in server 12 and the social network server 14 are separate in the illustrated embodiment, the present disclosure is not limited thereto. In an alternative embodiment, the functionality of the check-in server 12 and the social network server 14 may be combined. For example, the functionality of the check-in server 12, and particularly the ad function 32, may alternatively be incorporated into the social networking service 42.

The social networking service 42 is preferably implemented in software, but is not limited thereto. The social networking service 42 generally includes a status update function 46 and a sponsored ad function 48. The status update function 46 enables registered users of the social network server 14, such as the users 18 and 24, to post status updates, which are viewable by friends of the registered users in a social network maintained by the social networking service 42. As used herein, a status update is a message provided by a user for publication via a status update, or micro-blogging, service such as, for example, the Twitter® micro-blogging and social networking service or the Facebook® social networking service. The status update may include a text-based status update, an audio status update, a video status update, an image status update, or any combination thereof. As an example, a status update may be a tweet provided by a user of the Twitter® micro-blogging and social networking service or a post made by a user of the Facebook® social networking service, which are two exemplary status update services. Further, as described herein, status updates may also be photo advertisements created by the users 18 and 24 via the ad function 32 that are submitted as status updates of the users 18 and 24 that created the photo advertisements. For example, a photo advertisement created by the user 18-1 may be submitted to the status update function 46 as a status update of the user 18-1. The status update function 46 then publishes the photo advertisement as a status update of the user 18-1. The sponsored ad function 48 operates to obtain photo advertisements from the ad function 32 of the check-in server 12 and to present the photo advertisements to the registered users of the social network server 14 as sponsored advertisements. The user accounts repository 44 includes a user account 50 for each registered user of the social network server 14. The user account 50 of each of the registered users includes a user profile of the registered user, a social network graph of the registered user, status updates posted by the registered user, and the like.

The user devices 16-1 through 16-N are generally computing devices such as, for example, smartphones (e.g., Apple® iPhone®), tablet computers (e.g., Apple® iPad®), notebook computers, or similar devices. In this embodiment, the user devices 16-1 through 16-N are preferably mobile user devices, but are not limited thereto. The user devices 16-1 through 16-N include check-in clients 52-1 through 52-N (generally referred to herein collectively as check-in clients 52 and individually as check-in client 52) and social network clients 54-1 through 54-N (generally referred to herein collectively as social network clients 54 and individually as social network client 54). The check-in clients 52 and the social network clients 54 are preferably implemented in software, but are not limited thereto. The check-in clients 52 generally enable the users 18 to interact with the check-in server 12 to perform simple check-ins and photo check-ins as desired. The social network clients 54 enable the users 18 to interact with the social network server 14 to, for example, post status updates and to view status updates posted by their friends in the social network maintained by the social networking service 42.

The user device 22 is generally a computing device such as, for example, a smartphone (e.g., Apple® iPhone®), a tablet computer (e.g., Apple® iPad®), a notebook computer, a personal computer, or a similar device. The user device 22 includes a check-in client 56 and a social network client 58 that operate as described above with respect to the check-in clients 52 and social network clients 54 of the user devices 16. Notably, while only one user device 22 outside of the check-in zone 20 is illustrated, it should be understood that there may be any number of user devices 22 outside of the check-in zone 20 and at least some of these other user devices 22 may be located in other check-in zones.

Figure 2:
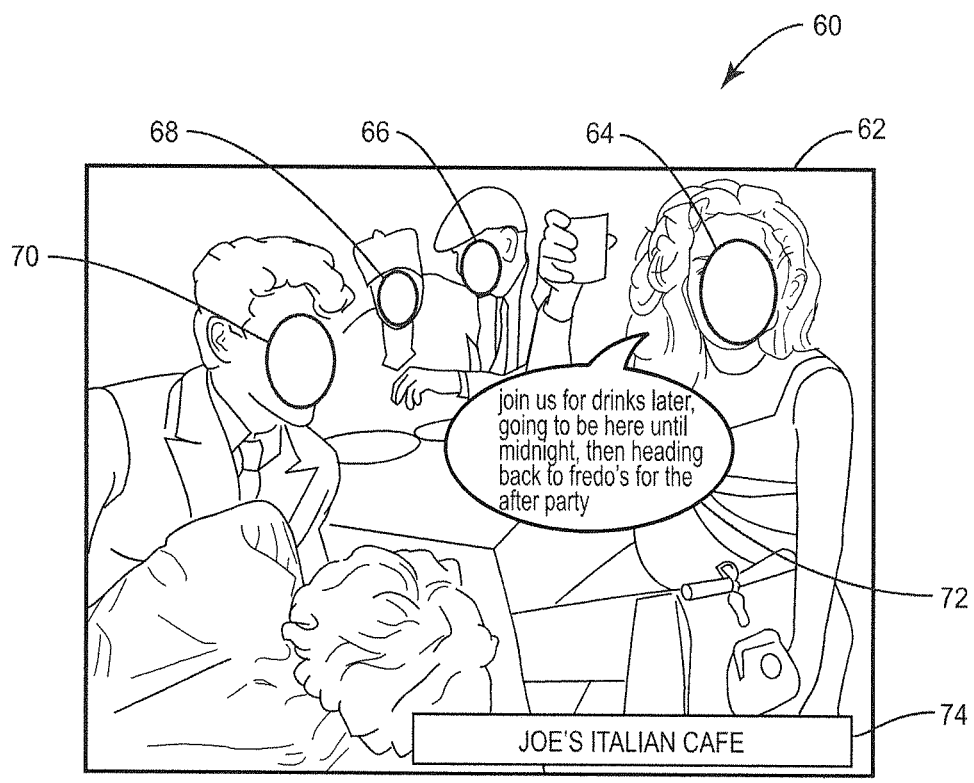
FIG. 2 illustrates an exemplary photo ad template used to generate photo advertisements according to one embodiment of the present disclosure.

FIG. 2 illustrates a photo ad template 60 according to one exemplary embodiment of the present disclosure. In this embodiment, the photo ad template 60 includes a picture 62 including photo wells 64 through 70. In this embodiment, the photo wells 64 through 70 are face knockouts, or knockouts of faces, of corresponding persons that appear in the picture 62. The photo ad template 60 also includes a text area 72 in which user-defined text may be inserted. Lastly, the photo ad template 60 includes an advertisement portion 74. In this example, the photo ad template 60 is a photo ad template for the restaurant "Joe's Italian Cafe." Notably, the photo ad template 60 may have been created by or on behalf of an owner or operator of "Joe's Italian Cafe" and submitted to the check-in server 12 for storage in the photo ad template repository 36 and subsequent use by users that desire to create photo advertisements for "Joe's Italian Cafe." Notably, the metadata for the photo ad template 60 in this embodiment may include, for example, data that indicates that there are four photo wells 64 through 70 in the photo ad template 60. In addition, the metadata for the photo ad template 60 may include data that defines locations of the photo wells 64 through 70 in the photo ad template 60 and/or dimensions of the photo wells 64 through 70 in the photo ad template 60. In addition, the metadata for the photo ad template 60 may include data that defines an ideal or required orientation for filler images to be inserted into the photo wells 64 through 70. Still further, for each of the photo wells 64 through 70, the metadata for the photo ad template 60 may include data that defines a class of users (e.g., gender and age range) for which the photo well is suitable. For example, the metadata for the photo ad template 60 may include data for the photo well 64 that defines women in the age range of 20 to 35 years old as being suitable for the photo well 64. As a result, male participants are not selected for the photo well 64. In addition, female participants that are not in the age range of 20 to 35 years old are also not selected for the photo well 64. Note that if a suitable participant is not found for a photo well, a default face image may be included to be placed in the photo well rather than leaving it empty, where the default image may be, for example, an original face in the photo ad template 60 (i.e., the default image may be an image of a face of a corresponding person appearing in the photo ad template 60 to provide the face well).

Figure 3A:
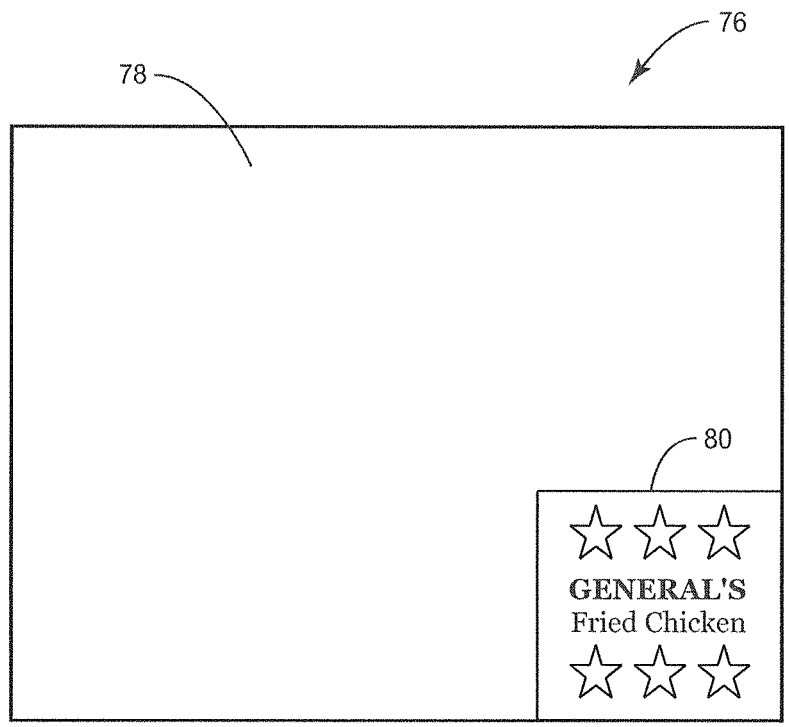
FIGS. 3A and 3B illustrate an exemplary photo ad template used to generate photo advertisements according to another embodiment of the present disclosure.
Figure 3B:

FIG. 3A illustrates a photo ad template 76 according to another exemplary embodiment of the present disclosure. In this embodiment, the photo ad template 76 includes a photo well 78 and an advertisement portion 80. In this embodiment, the advertisement portion 80 is an ad for a restaurant named "General's Fried Chicken." A user selected image is inserted into the photo well 78 to provide a resulting photo advertisement as illustrated in FIG. 3B. The user selected image may be selected from a local repository of photos stored by the corresponding user device, selected from a number of photos previously posted by the user via the social networking service 42, or the like. Note that in the photo ad template 76 of FIG. 3A, there is only one photo well 78, and that the filler image for the photo well 78 does not have to be a person's face, and in fact may be any image. If the photo well 78 is to be filled with a type of image other than a person's face (e.g., a specific type of product such as a beverage), then this fact should be stored in the metadata for the photo well 78. In one embodiment of the present disclosure, the image chosen to fill in the photo well 78 is automatically chosen from the images stored on the user's device based on matching the current geographical location with the capture location of the stored image. Note also that the image may be chosen based on matching the faces of nearby participants with the faces present in the images on the user's device.

Figure 4:
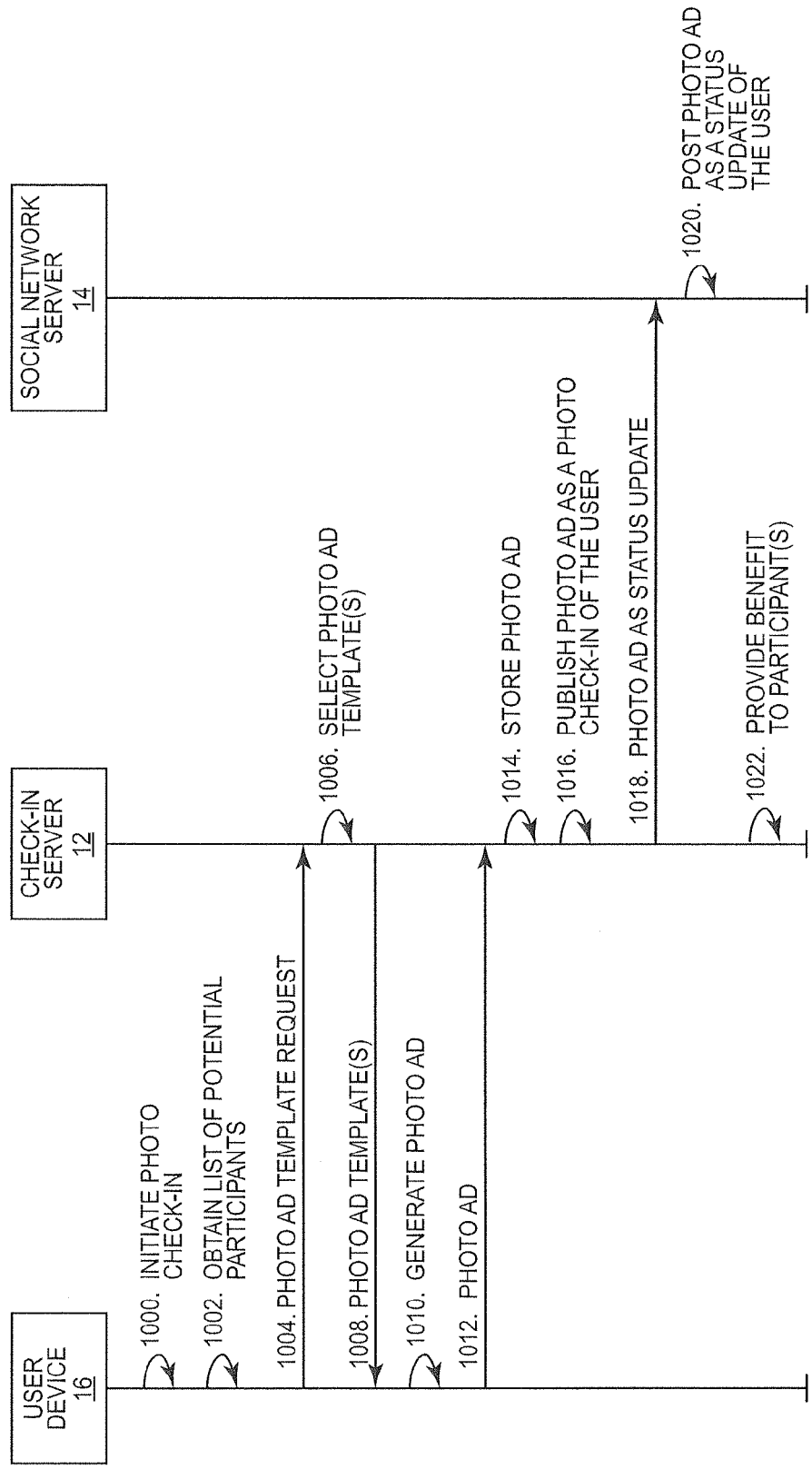
FIG. 4 illustrates the operation of the system of FIG. 1 to generate a photo advertisement according to one embodiment of the present disclosure.

FIG. 4 illustrates the operation of the system 10 of FIG. 1 to enable user creation of a photo advertisement using a photo ad template according to one embodiment of the present disclosure. As illustrated, one of the user devices 16 in the check-in zone 20 initiates a photo check-in process (step 1000). In one embodiment, the check-in client 52 of the user device 16 receives user input from the user 18 of the user device 16 and initiates the photo check-in process in response to the user input. For example, the user 18 may launch the check-in client 52 and select a photo check-in button. In another embodiment, the check-in client 52 determines that the user device 16 is within the check-in zone 20 and automatically initiates the photo check-in process. For example, the check-in client 52 may obtain a current location of the user device 16 from, for example, a Global Positioning System (GPS) receiver of the user device 16 and query the check-in server 12 to determine whether the user device 16, and thus the user 18, is currently located within any check-in zone. In response, the check-in server 12 may map the current location of the user device 16 to the check-in zone 20 using a stored database of check-in zones and then notify the check-in client 52 that the user device 16 is located in the check-in zone 20. The check-in client 52 may then automatically initiate the photo check-in process.

Next, the check-in client 52 of the user device 16 obtains a list of potential participants (step 1002). The list of potential participants includes the user 18 of the user device 16 and, in some embodiments, one or more additional potential participants identified by the check-in client 52. In order to identify the one or more additional potential participants, in one embodiment, the check-in client 52 utilizes a local wireless communication interface of the user device 16 to detect at least some of the other user devices 16 in the check-in zone 20. The local wireless communication interface is preferably a Bluetooth® interface (e.g., a class 2 Bluetooth® interface having a range of approximately 10 meters or a class 3 Bluetooth® interface having a range of approximately 3 meters), an IEEE 802.11x interface, or similar wireless interface. The users 18 of the other user devices 16 detected within the local wireless communication range of the user device 16 or a select subset thereof are identified as the one or more additional potential participants. Additional criteria may be used to further limit the additional potential participants. The additional criteria may be, for example, degree of separation from the user 18 in the social network maintained by the social network server 14, inclusion in a contact list maintained by the user device 16 of the user 18, and user preferences of the user 18 of the user device 16. The user preferences of the user 18 may include, for example, preferences that define users that can or cannot be used as participants in photo advertisements created by the user 18. For example, the one or more additional potential participants may be the users 18 of the user devices 16 detected within the local wireless communication range of the user device 16 that are also within a defined degree of separation from the user 18 of the user device 16 in the social network maintained by the social networking service 42.

In another embodiment, the check-in client 52 utilizes the local wireless communication interface of the user device 16 to query nearby users, such as at least some of the other users 18 in the check-in zone 20, to determine whether they would be willing to participate in a photo advertisement. For example, the check-in client 52 may broadcast a query via a Bluetooth® interface of the user device 16. The other user devices 16 that are within the range of the Bluetooth® interface of the user device 16 receive the query and, if the corresponding users 18 are willing to participate, respond to the query. The responses may be generated automatically based on predefined preferences of the users 18 or generated upon receiving user input from the users 18 that indicate that the users 18 are willing to participate. The responses to the query preferably identify the other users 18 that are willing to participate. In another embodiment, the check-in client 52 utilizes a Near Field Communication (NFC) interface of the user device 16 to detect the other user devices 16 of nearby users 18.

In yet another embodiment, the check-in client 52 queries the social network server 14 to obtain a list of other users such as the other users 18 and 24 that are within a predefined degree of separation from the user 18 of the user device 16 within the social network maintained by the social networking service 42 and, in some embodiments, are located near the user 18 of the user device 16. Other users may be determined to be located near the user 18 if they are sufficiently near the user 18 as defined by one or more system-defined or user-defined criteria. For example, the other users may be determined to be near the user 18 if they are located at the same geographic location as the user 18 or located within a predefined distance from the user 18.

In yet another embodiment, the user 18 manually selects the one or more additional potential participants. More specifically, the user 18 may manually select the one or more additional potential participants from a contact list stored on the user device 16. As another example, the user 18 may manually select the one or more additional potential participants from a list of friends of the user 18 in the social network maintained by the social networking service 42.

After obtaining the list of additional potential participants, the check-in client 52 sends a photo ad template request to the check-in server 12 (step 1004). The photo ad template request preferably identifies the check-in zone 20 in which the user 18 is located and includes potential participant information. The potential participant information is data that describes the potential participants. The potential participant information may include one or more of the following:

the number of potential participants,
the gender of each of the potential participants,
age information for the potential participants (e.g., the age or an age range for each of the potential participants),
user profile information (e.g., demographic information, interests, purchase history, web browsing history, music playback history, video playback history, and/or the like) that describes the potential participants, and
identifiers (IDs) of the potential participants used by the check-in server 12, which may be used to:
  obtain user profile information that describes the potential participants from the user accounts 40 of the potential participants stored in the user accounts repository 34 of the check-in server 12, or
  obtain user profile information that describes the potential participants from the social network server 14 using credentials (e.g., usernames and passwords) of the potential participants for the social network server 14 stored in the user accounts 40 of the potential participants in the user accounts repository 34 of the check-in server 12.

Notably, in the preferred embodiment, the user 18 is required to participate in the photo advertisement. As such, when selecting the photo ad template(s), the data describing the user 18 may be given priority over the data describing the other potential participants.

In response to the photo ad template request, the ad function 32 of the check-in server 12 selects one or more of the photo ad templates stored in the photo ad template repository 36 that satisfy the photo ad template request (step 1006). More specifically, in one embodiment, the ad function 32 queries the photo ad template repository 36 for photo ad templates that are applicable to the check-in zone 20. The ad function 32 then selects one or more of the applicable photo ad templates that best match the potential participants based on the potential participant information. More specifically, in one embodiment, the ad function 32 selects those applicable photo ad templates having photo wells for which there are suitable potential participants. For example, if the potential participants include two males and two females, then the ad function 32 may select only those photo ad templates that are applicable to the check-in zone 20 and that have two or less photo wells for males and two or less photo wells for females. In addition, when selecting the one or more photo ad templates, the ad function 32 may also consider a potential audience of a resulting photo ad. For example, if the photo ad is likely to be viewed by friends in the social network of the user 18, then the ad function 32 may also consider preferences of the friends of the user 18, purchase histories of the friends of the user 18, and/or the like. The ad function 32 then returns the one or more photo ad templates selected in response to the photo ad template request to the user device 16 (step 1008).

The check-in client 52 then operates to generate a photo advertisement using one of the one or more photo ad templates returned by the check-in server 12 (step 1010). More specifically, in one embodiment, filler images are selected for the one or more photo wells in one of the photo ad templates. The filler image of the user 18 is selected for one of the photo wells in the photo ad template. Note that if a filler image is not provided by the user 18, one may be automatically selected and extracted from the user's 18 existing photos using image processing methods, such as, for example, face detection. In one embodiment, the metadata for the photo ad template identifies one of the photo wells as a primary photo well, and the filler image of the user 18 is automatically selected for the primary photo well. In addition, if the photo ad template includes more than one photo well, a different one of the additional potential participants is selected for each of the remaining photo wells. In another embodiment, multiple filler images may be selected for each photo well in one of the photo ad templates to thereby provide a photo advertisement. In this manner, different filler images may be inserted into the photo ad template depending on the intended recipient of the photo advertisement. This may be particularly beneficial when using the photo advertisements as sponsored advertisements as described below. Still further, the photo ad template may include a product placement feature, where the user 18 is enabled to select a product to be placed into the photo advertisement as a secondary advertisement. For instance, the photo ad template may have a space for a beverage, where the user 18 is enabled to select the particular beverage (e.g., a soda can of a particular soft drink) to appear in the photo advertisement. As another example, the item for the product placement feature may be automatically selected or recommended based on, for example, a purchase history of the user 18. In yet another embodiment, the user 18 may actually be presenting the product of interest in the filler image, such as by holding a soda can prominently, and the product placement feature may be automatically identified using image-processing methods such as logo detection.

The check-in client 52 then sends the photo advertisement to the check-in server 12 (step 1012). More specifically, the check-in client 52 sends photo advertisement data to the check-in server 12. In one embodiment, the photo advertisement data is the actual photo advertisement. In another embodiment, the photo advertisement data is data that defines the photo advertisement such that the photo advertisement can subsequently be produced by the ad function 32 and/or an ad requestor (e.g., the social networking service 42). In one embodiment, the data that defines the photo advertisement includes: (a) information that identifies the photo ad template (e.g., a unique ID of the photo ad template), (b) information that identifies the filler image(s) of the participants selected for the photo advertisement (e.g., URIs), and (c) information that links the filler images to the appropriate photo wells in the photo ad template. In another embodiment, the data that defines the photo advertisement includes: (a) information that identifies the photo ad template (e.g., a unique ID of the photo ad template), (b) the filler image(s) of the participants selected for the photo advertisement, and (c) information that links the filler images to the appropriate photo wells in the photo ad template. Notably, the data that defines the photo advertisement may be provided in, for example, an Extensible Markup Language (XML) format.

The ad function 32 of the check-in server 12 stores the photo advertisement as one of the photo advertisements in the photo ad repository 38 (step 1014). Preferably, the ad function 32 also stores the metadata for the photo advertisement. Notably, once stored in the photo ad repository 38, the photo advertisement may have a system-defined or user-defined ad lifetime. The ad lifetime defines an amount of time after which the photo advertisement is removed from the photo ad repository 38 or otherwise disabled. The ad lifetime may be defined as an absolute amount of time (e.g., 1 week), a number of ad impressions (e.g., provided in response to 10 ad requests, presented to 25 ad targets, or the like), or the like. It should also be noted that, as discussed below, the stored photo ad can subsequently be used to serve photo ad requests. However, before being used to serve photo ad requests, the photo ad may be manually or automatically reviewed to ensure that the photo ad is suitable for use as a photo ad. Automated methods include image processing methods, such as detecting obscenities, logo detection to ensure any rival products are not being depicted, face detection to ensure that a face is in the image, and face identification to ensure that the face belonging to the user 18 is in the photo ad.

The ad function 32 of the check-in server 12 also publishes the photo advertisement as a photo check-in of the user 18 (step 1016) and sends the photo advertisement to the social network server 14 as a status update for the user 18 (step 1018). In response, the status update function 46 of the social networking service 42 posts the photo advertisement as a status update of the user 18 (step 1020). The manner in which the photo advertisement is posted as a status update of the user 18 depends on the particular implementation of the social networking service 42. For example, in one embodiment, the social networking service 42 is, or is similar to, the Facebook® social networking service, and the photo check-in is posted to the Facebook® wall of the user 18. However, the present disclosure is not limited thereto. Further, when posting the status update, a text that identifies the participants in the photo advertisement may accompany the photo advertisement in the status update. In addition or alternatively, the filler images of the participants in the photo advertisement may be user-selectable such that other users can select the filler image of a desired participant to view additional information related to that participant (e.g., status updates from that participant, other photo advertisements in which that participant has participated, and/or the like).

Lastly, the ad function 32 of the check-in server 12 provides a benefit to the participants appearing in the photo advertisement in return for participating in the photo advertisement (step 1022). The benefit is preferably in the form of a coupon, but is not limited thereto. The benefit may be returned to the participants by sending a coupon to the check-in clients 52 of the participants. Alternatively, the benefit may be returned to the participants in some other manner (e.g., text message, e-mail, or the like). Note also that the value of any coupon or other consideration may scale based on the number of times a photo advertisement is used.

Figure 5A:
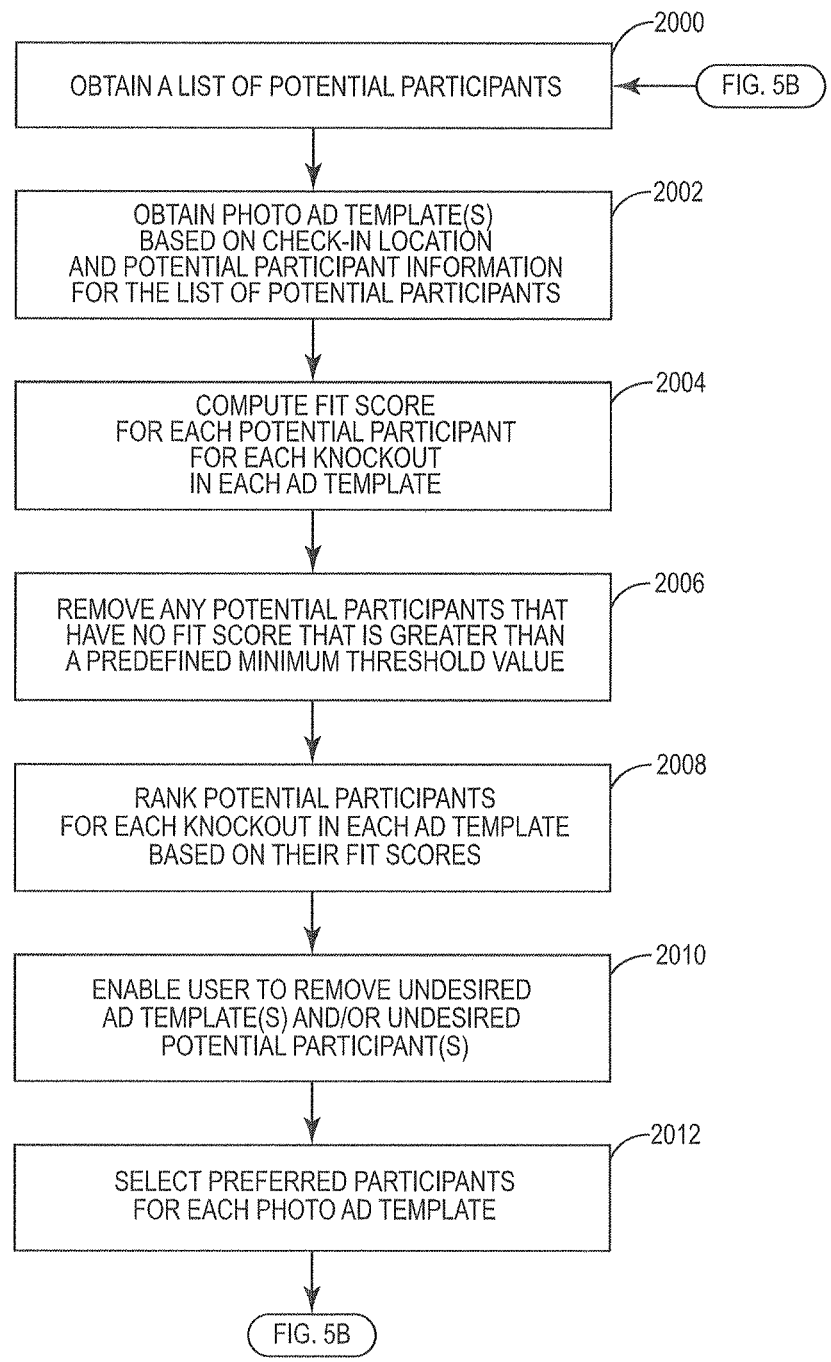
FIGS. 5A and 5B are a flow chart illustrating a process for generating a photo advertisement according to one embodiment of the present disclosure.
Figure 5B:
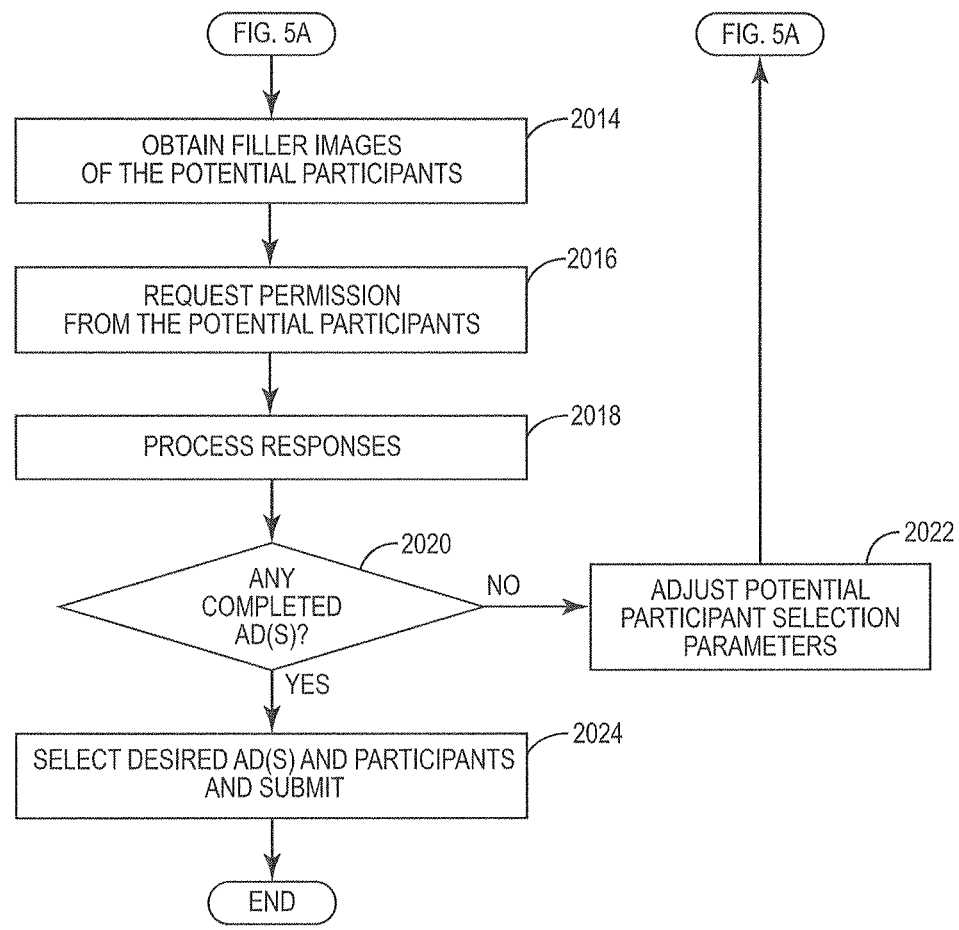

FIGS. 5A and 5B illustrate the photo advertisement creation process in more detail according to one embodiment of the present disclosure. In this discussion, the process of FIGS. 5A and 5B is performed by the check-in client 52. However, it should be appreciated that this process or portions of this process may alternatively be performed by the ad function 32. Further, in this embodiment, the photo ad templates include preselected pictures having photo wells that are knockouts of faces of persons appearing in the picture as described above with respect to FIG. 2.

First, the check-in client 52 obtains a list of potential participants as described above with respect to step 1002 of FIG. 4 (step 2000). The check-in client 52 then obtains one or more photo ad templates from the check-in server 12 based on the check-in location, which in this embodiment is the check-in zone 20, and potential participant information that describes the potential participants identified in step 2000 (step 2002). More specifically, in this embodiment, the check-in client 52 sends a photo ad template request to the check-in server 12 and, in response, receives the one or more photo ad templates from the ad function 32 of the check-in server 12, as described above with respect to steps 1004 through 1008 of FIG. 4.

Next, in this embodiment, the check-in client 52 computes a fit score for each potential participant for each knockout in each of the one or more photo ad templates obtained in step 2002 (step 2004). In other words, a fit score is computed for each potential participant and knockout pair. Notably, in one embodiment, the user 18 may be required to be the participant for a primary knockout in each of the photo ad templates. In this case, fit scores may only be generated for each additional potential participant for each knockout in each of the one or more photo ad templates other than the primary knockouts to which the user 18 is required to be assigned. However, in another embodiment, while the user 18 is still preferably required to participate in the photo advertisement, the user 18 may not be required to be assigned to any one knockout in each of the photo ad templates. In this case, fits scores may be computed for all potential participants including the user 18 for each knockout in each of the one or more photo ad templates.

For each potential participant and knockout combination for which a fit score is to be computed, the fit score reflects a degree to which the potential participant matches the knockout. More specifically, in one embodiment, the fit score is computed based on one or more predefined criteria such as, for example:

- a degree to which the potential participant is suitable for the knockout, which may specifically be a degree to which the user profile of the potential participant matches the portion of the metadata for the corresponding photo ad template that defines a class of users that are suitable for the knockout,
- a degree to which the potential participant is suitable for the photo ad template in general, which may specifically be a degree to which the user profile of the potential participant (e.g., demographics, purchase history, music listening history, viewing history, web browsing history, location history, interests, or the like) matches a portion of the metadata for the corresponding photo ad template that defines a class of users that are suitable for the photo ad template in general,
- whether the potential participant has provided a filler image for use in photo advertisements (note that this may alternatively be a pre-requisite for being identified as a potential participant),
- a geographic distance between the user 18 creating the photo advertisement and the potential participant,
- a social distance (i.e., a degree of separation) between the user 18 and the potential participant in the social network maintained by the social networking service 42,
- a geographic distance between the potential participant and the POI being advertised, and
- a social distance between the potential participant and the POI being advertised in the social network maintained by the social networking service 42.

A high fit score indicates a strong match between the corresponding potential participant and knockout pair. Conversely, a low fit score indicates a weak match between the corresponding potential participant and knockout pair.

Next, the check-in client 52 removes, or prunes, any of the potential participants that have no fit score that is greater than a predefined minimum threshold value (step 2006). In this manner, any of the potential participants that do not sufficiently match any of the knockouts in any of the photo ad templates obtained in step 2002 are removed from the list of potential participants. For example, if one of the potential participants is a 13 year old female but the photo ad templates only have photo wells for 20+ year old males and females, then the 13 year old female is to be removed as a potential participant. Notably, some filtering may be performed before calculating fit scores (e.g., when identifying potential participants), where this filtering may ensure that persons that would not match any of the knockouts would not be identified as potential participants. In this embodiment, the potential participants are then ranked for each knockout in each of the photo ad templates based on the corresponding fit scores (step 2008), and the user 18 of the user device 16 is enabled to remove any undesired photo ad templates and/or any undesired potential participants (step 2010). Notably, if the user 18 removes one of the photo ad templates, any of potential participants that no longer have at least one fit score that is greater than the predefined minimum threshold value in step 2006 may be removed.

Next, in this embodiment, preferred participants for each knockout in each of the photo ad templates are selected (step 2012). More specifically, in the preferred embodiment, the user 18 is required to participate in the photo advertisement. For example, the user 18 may be required to be the participant for a primary knockout in each of the photo ad templates. As another example, the user 18 may be required to participate but may be enabled to choose which knockout he or she desires. As such, once one of the knockouts in each photo ad template is allocated for the user 18, preferred participants are selected for the remaining knockouts in the photo ad templates.

In one embodiment, the preferred participants for the remaining knockouts in each photo ad template are manually selected by the user 18. In this case, the fit scores and/or rankings of the potential participants may be presented to the user 18 or otherwise utilized to assist the user 18 in selecting the preferred participants for the knockouts. For example, for each remaining knockout in each of the photo ad templates, the user 18 may be presented with a list of potential participants for the knockout that is sorted based on rank, and the user 18 may select the preferred participant for the knockout from the sorted list of potential participants for the knockout.

In another embodiment, the preferred participants for the remaining knockouts in each photo ad template are automatically selected by the check-in client 52. More specifically, for each photo ad template, the check-in client 52 may first select the potential participant having the highest fit score across all of the remaining knockouts for the photo ad template as the preferred participant for the knockout for which that potential participant has the highest fit score. That potential participant is then removed from the pool of available participants for the remaining knockouts and the process is repeated until the "best" potential participants for the knockouts in the photo ad template have been selected as the preferred participants. This process is repeated to select the preferred participants for any remaining photo ad templates.

In yet another embodiment, for each photo ad template, the user 18 is first selected as the preferred participant for the knockout in the photo ad template for which the user 18 has his or her highest fit score or ranking. Then, the user 18 is removed from the pool of potential participants for the remaining knockouts in the photo ad template, and the potential participant having the highest fit score across all of the remaining knockouts in the photo ad template is selected as the preferred participant for the knockout for which that potential participant has the highest fit score. That potential participant is then removed from the pool of available participants for the remaining knockouts and the process is repeated until the "best" potential participants for the knockouts in the photo ad template have been selected as the preferred participants. This process is repeated to select the preferred participants for any remaining photo ad templates.

In each of the three aforementioned embodiments for selecting the preferred participants for the knockouts, in some situations, the selection of a potential participant as the preferred participant for a first knockout may result in there being no potential participants remaining for a second knockout. In this case, if there are remaining potential participants for the first knockout, then the potential participant may be changed from the preferred participant for the first knockout to a preferred participant for the second knockout. One of the remaining potential participants may then be selected as the preferred participant for the first knockout. Alternatively, the same potential participant may be selected as the preferred participant for the first and second knockouts. In addition, the user 18 may be enabled to edit or modify the preferred participants for the knockouts.

The check-in client 52 then obtains filler images of the potential participants (step 2014). In one embodiment, the check-in client 52 obtains the filler images of all of the potential participants including the preferred participants. In another embodiment, the check-in client 52 obtains the filler images of only the preferred participants. Preferably, the registered users of the check-in server 12 predefine images to be used in photo advertisements. These predefined images are referred to herein as default filler images of the registered users and may be stored by the corresponding user devices 16 or 22, the check-in server 12, or the social network server 14. Thus, the filler images of the potential participants obtained in step 2014 are preferably the default filler images of the potential participants obtained from the corresponding user devices 16 or 22, the check-in server 12, or the social network server 14. In another embodiment, the filler images may be captured on-demand during the photo ad creation process, for example, by using the in-built cameras of the user devices 16 or 22.

The check-in client 52 then requests permission from the potential participants (step 2016). In one embodiment, the check-in client 52 requests permission from all of the potential participants including the preferred participants. In another embodiment, the check-in client 52 requests permission from only the preferred participants. More specifically, the potential participants include the user 18 of the user device 16 and one or more additional potential participants. Permission from the user 18 of the user device 16 may be implied since the user 18 initiated the photo check-in process. Permission from the one or more additional potential participants may be obtained by sending corresponding permission requests to the check-in clients 52 or 56 of the corresponding user devices 16 or 22 either directly or via the ad function 32 of the check-in server 12. In one embodiment, the permission request sent to a particular user includes the one or more photo ad templates and information that identifies one or more of the knockouts into which the filler image of the potential participant may be inserted. More specifically, in one embodiment, permission is requested only from the preferred participants, and the permission request sent to a particular user includes the photo ad template(s) for which the user has been selected as a preferred participant. Further, for each photo ad template for which the user has been selected as a preferred participant, the photo ad template included in the permission request may include the filler image of the user inserted into the knockout for which the user has been selected as the preferred participant.

The check-in client 52 then processes responses to the requests for permission sent to the potential participants (step 2018). Each response indicates whether a corresponding potential participant has granted permission to be used as a participant, denied permission to be used as a participant, or requested that a different filler image of the potential participant be used. Notably, in one embodiment, a time-out period is defined where any potential participant for which responses have not been received by the end of the time-out period are deemed to have denied permission to be used as a participant.

In one embodiment, the potential participants manually choose whether to grant permission to be used as a participant. In another embodiment, the potential participants may choose to configure rules for automatically granting or denying permission to be used as a participant. These rules may be based on social network relationship, ad rating, advertised place, product, service, and/or the like. Note that, in an alternative embodiment, these automatic acceptance or denial rules may be taken into consideration when selecting potential participants and/or selecting the preferred participants for the knockouts in the photo ad template.

After all responses have been received or after the time-out period has expired, the check-in client 52 determines whether there are any completed photo advertisements (step 2020). In the embodiment where the filler images are obtained and permission requested for only the preferred participants, a completed photo advertisement is one resulting when all of the preferred participants for all of the knockouts in one of the photo ad templates have granted permission to be used as participants in the photo advertisement. Note that if there is more than one photo ad template, then there may be more than one completed photo advertisement. In the embodiment where filler images are obtained and permission requested for all of the potential participants, a completed photo advertisement is one resulting when at least one different potential participant has granted permission to be used as a participant for each knockout in one of the photo ad templates. Again, note that if there is more than one photo ad template, then there may be more than one completed photo advertisement.

If there are no completed photo advertisements, then the check-in client 52 adjusts parameters used to obtain the list of potential participants in step 2000 in such a manner as to result in a larger list of potential participants or a list of all new potential participants (except of course the user 18) (step 2022). The process then returns to step 2000 and is repeated. If there is at least one completed advertisement, one or more of the completed photo advertisements are selected and submitted to the ad function 32 of the check-in server 12 (step 2024). More specifically, in the embodiment where the filler images are obtained and permission is requested from only the preferred participants, once all of the preferred participants for one photo ad template have granted permission to be used as participants, the filler images of the preferred participants are inserted into or otherwise associated with the corresponding knockouts of the photo ad template to complete the photo advertisement. If there is more than one photo ad template for which all of the preferred participants grant permission to be used as participants in the photo advertisement, then there are multiple completed photo advertisements. In this embodiment, the user 18 then selects one or more of the completed photo advertisements to be submitted to the ad function 32 of the check-in server 12. If the user 18 selects more than one completed photo advertisement, the user 18 may also select one of the completed photo advertisements to be used as a photo check-in and/or status update of the user 18. After step 2024, the process ends.

In the embodiment where the filler images are obtained and permission is requested from all of the potential participants, a photo advertisement is complete once at least one different potential participant has granted permission to be used for each knockout in the corresponding photo ad template. If more than one potential participant grants permission to be used in the same knockout, then the preferred participant for the knockout is selected for the knockout if the preferred participant is one of the potential participants that has granted permission to be used in the knockout. Otherwise, the highest ranked or scored potential participant that has granted permission to be used in the knockout and that has not already been selected for one of the other knockouts in the photo ad template is selected for the knockout. Once a participant has been selected for each knockout in the photo ad template, then the filler images for those participants are inserted into or otherwise associated with the corresponding knockouts in the photo ad template to provide the completed photo advertisement. Alternatively, the user 18 may manually select the participants for each knockout from the potential participants that have granted permission to be used in the knockout. As another alternative, the photo advertisement may be submitted with one or more participants for each knockout, where a participant for each knockout is subsequently selected based on, for example, an intended recipient of the photo advertisement.

Figure 6A:
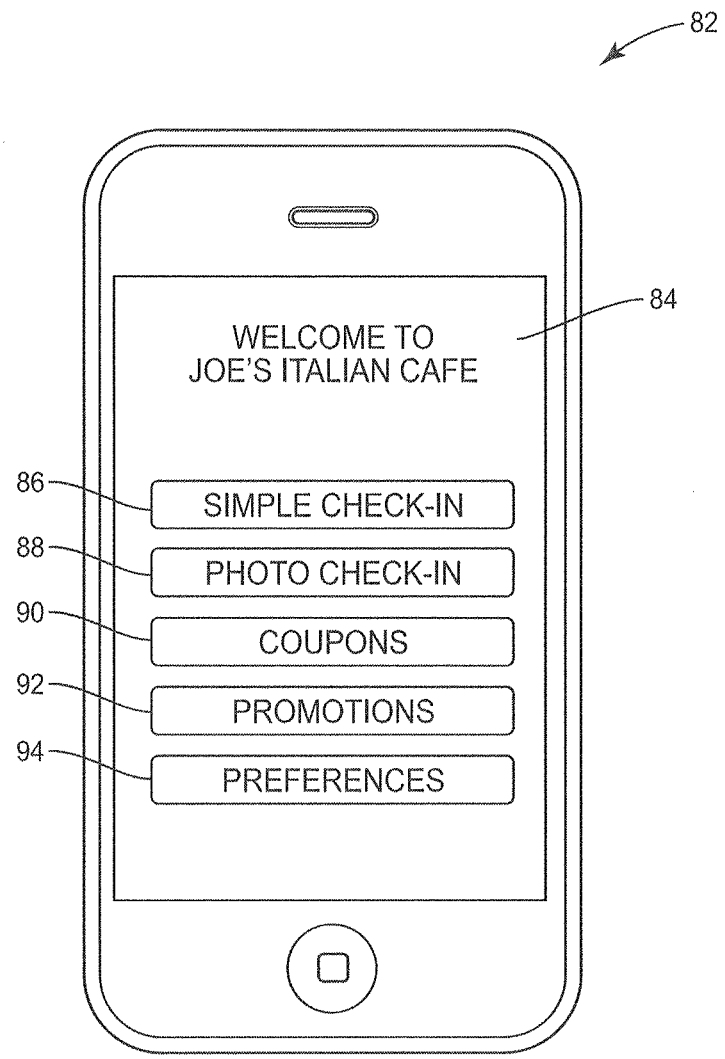
FIGS. 6A through 6E illustrate an exemplary Graphical User Interface (GUI) that may be provided to enable a user to create a photo advertisement according to the process of FIGS. 5A and 5B.

FIGS. 6A through 6E illustrate an exemplary Graphical User Interface (GUI) 82 provided by the check-in client 52 to enable the user 18 to create a photo advertisement and submit the photo advertisement as a photo check-in of the user 18 according to one embodiment of the present disclosure. As illustrated in FIG. 6A, the GUI 82 includes a main screen 84 that includes a simple check-in button 86, a photo check-in button 88, a coupons button 90, a promotions button 92, and a preferences button 94. The main screen 84 is presented to the user 18 either automatically or upon request and generally enables the user 18 to initiate either a simple check-in or a photo check-in for the check-in zone 20 in which the user 18 is located. In this example, the check-in zone 20 is a geographic area corresponding to a restaurant called "Joe's Italian Cafe."

If the user 18 selects the simple check-in button 86, the check-in client 52 operates to create a simple check-in based on user input from the user 18 and submit the simple check-in to the check-in server 12. If the user 18 selects the photo check-in button 88, the photo check-in process described above is initiated. If the user 18 selects the coupons button 90, the user 18 is enabled to view coupons that the user 18 has received in return for participating in photo advertisements. Notably, coupons may be earned when the photo advertisements are submitted and/or when the photo advertisements are used. If the user 18 selects the promotions button 92, the user 18 is enabled to view special promotions such as, for example, a promotion being run by a business establishment corresponding to the check-in zone 20 saying that a particular benefit will be given to the user 18 (e.g., a coupon) in response to creating a photo advertisement for the business establishment. Lastly, if the user 18 selects the preferences button 94, the user 18 is enabled to configure preferences related to the creation and use of photo advertisements.

Figure 6B:
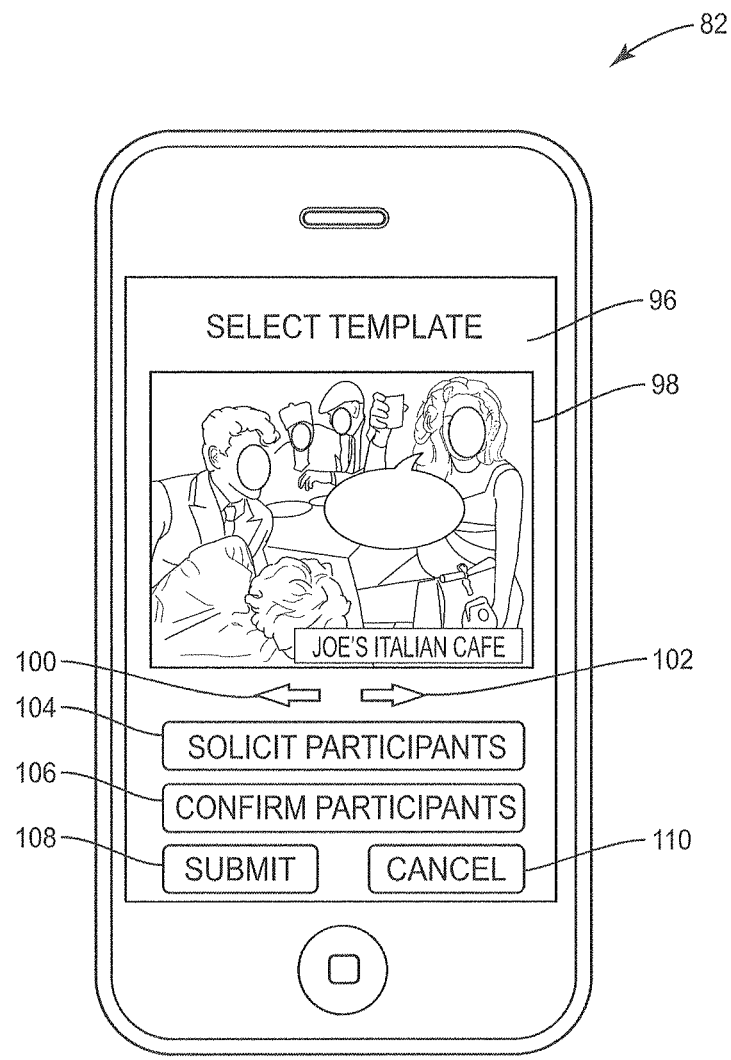

More specifically, FIG. 6B illustrates a photo check-in screen 96 that is presented to the user 18 in response to selecting the photo check-in button 88 according to one embodiment of the present disclosure. The photo check-in screen 96 includes a photo ad template display area 98, navigation buttons 100 and 102 for navigating through multiple photo ad templates, a solicit participants button 104, a confirm participants button 106, a submit button 108, and a cancel button 110. During the photo ad check-in process, the user 18 may first select the solicit participants button 104. In response, the check-in client 52 obtains a list of potential participants and sends a photo ad template request to the check-in server 12, as described above. The one or more photo ad templates returned to the check-in client 52 are displayed in the photo ad template display area 98. If more than one photo ad template is returned, the user 18 may use the navigation buttons 100 and 102 to navigate through the photo ad templates. The user 18 may select a knockout in the photo ad template displayed in the photo ad template display area 98 to, for example, view a ranked list of potential participants for that knockout, remove potential participants from the ranked list of potential participants for that knockout, and/or select a preferred participant for that knockout. The photo ad template illustrated in FIG. 6B has a text area which may be selected by the user 18 to enter desired text to appear in the text area. Then, the user 18 selects the confirm participants button 106. In response, the check-in client 52 requests permission from the potential participants or at least the preferred potential participants for the photo ad template(s). Once one or more of the photo advertisements have been completed and, in some embodiments, one or more desired completed photo advertisements have been selected, the user 18 selects the submit button 108 in order for the completed photo advertisement(s) to be submitted to the check-in server 12. Lastly, the user 18 may select the cancel button 110 at any time to cancel the photo ad check-in process.

Figure 6C:
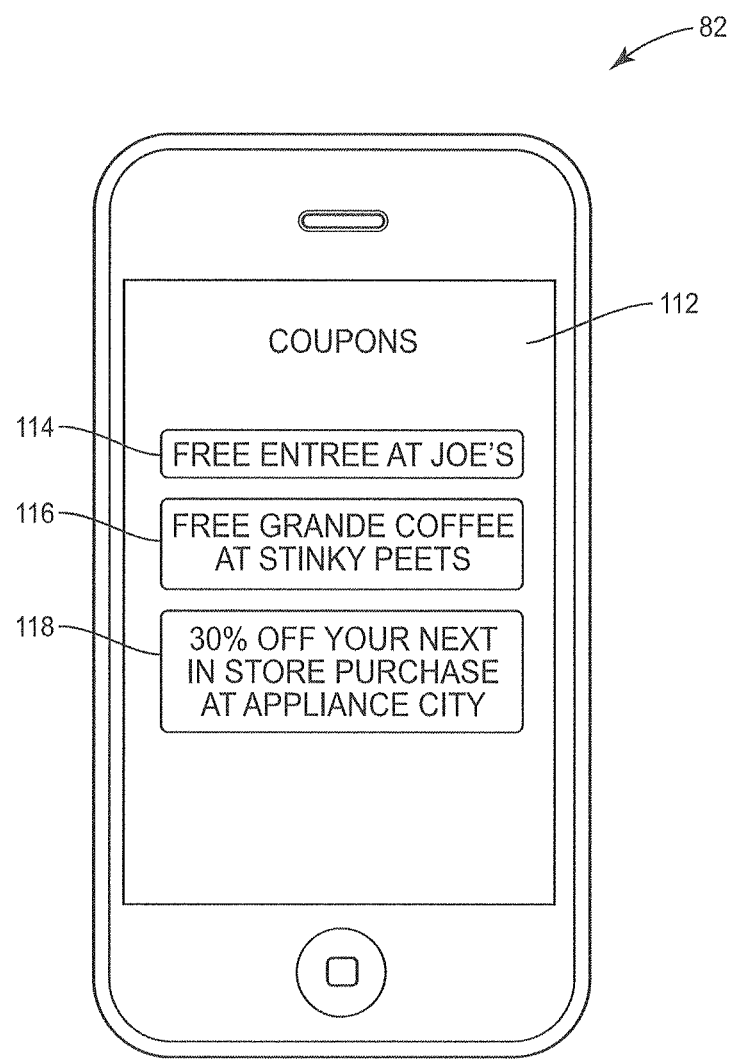
Figure 6D:
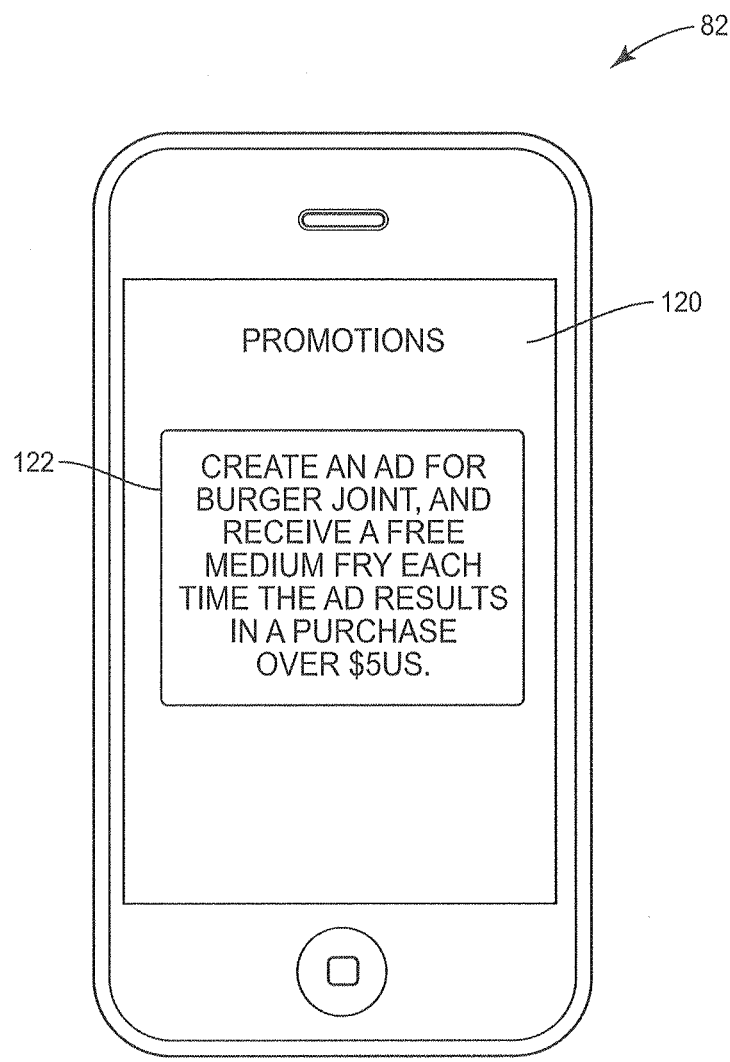

FIG. 6C illustrates a coupon screen 112 that is presented to the user 18 in response to selecting the coupons button 90 according to one embodiment of the present disclosure. In this example, the user 18 has earned three coupons 114 through 118. FIG. 6D illustrates a promotions screen 120 that is presented to the user 18 in response to selecting the promotions button 92 according to one embodiment of the present disclosure. In this example, one promotion 122 is being offered to the user 18.

Figure 6E:
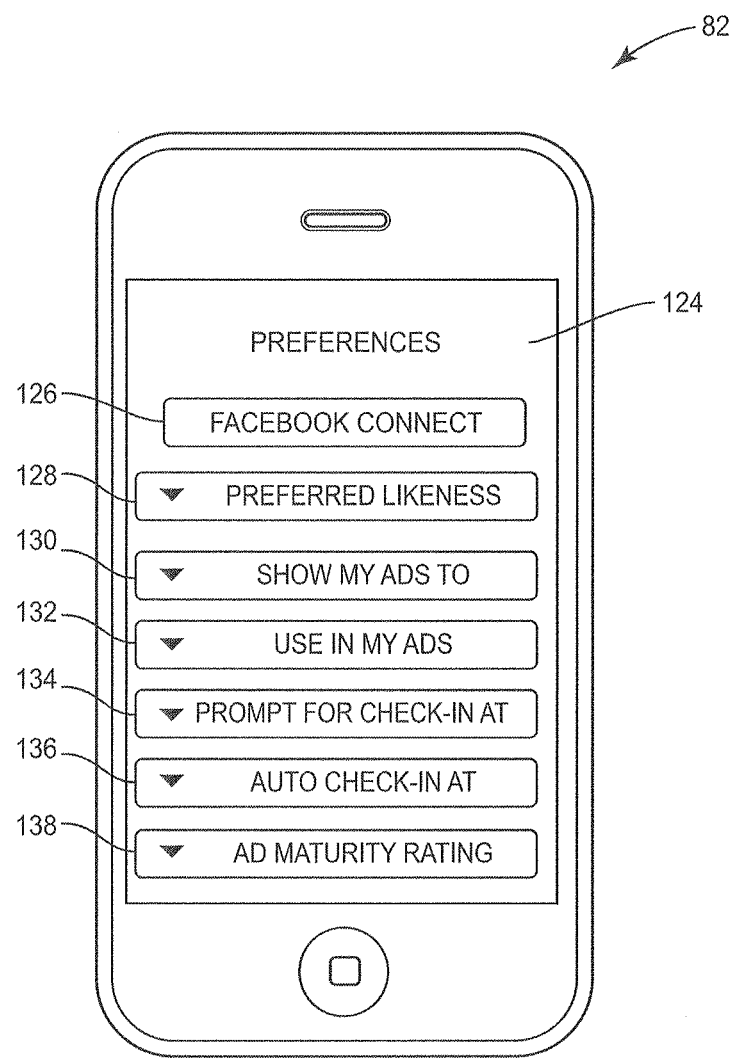

FIG. 6E illustrates a preferences screen 124 that is presented to the user 18 in response to selecting the preferences button 94 according to one embodiment of the present disclosure. In this example, the preferences screen 124 includes a Facebook® Connect button 126 and a number of buttons 128 through 138 for selecting various preferences. The Facebook® Connect button 126 enables the user 18 to provide credentials (e.g., username and password) that enable the check-in client 52 and/or the check-in server 12 to access a social graph of the user 18 from the social networking service 42 and/or to obtain user profile information for the user 18 from the social networking service 42. The social graph of the user 18 identifies friends and, in some embodiments, friends of friends of the user 18 up to a defined maximum degree of separation (e.g., 3 degrees of separation) in the social network maintained by the social networking service 42. The button 128 enables the user 18 to select a preferred, or default, filler image of the user 18 to be used in photo advertisements created by the user 18 as well as photo advertisements created by other users in which the user 18 participates. The button 130 enables the user 18 to select classes of users to which photo advertisements created by the user 18 can be shown. Some exemplary classes of users are friends of the user 18 in the social network maintained by the social networking service 42, other users within a defined degree of separation from the user 18 in the social network maintained by the social networking service 42, other users within a defined geographic distance from the user 18, or the like. While not illustrated, the preferences screen 124 may enable the user 18 to define additional or alternative user preferences such as, for example, an ad lifetime for the photo advertisement (e.g., a total number of ad impressions, an absolute amount of time, or the like), a maximum frequency of use of the photo advertisement, one or more websites on which the photo advertisement can or cannot be used, and/or the like. Note that these user preferences may be ad specific preferences, general preferences that are applicable to all photo advertisements created by the user 18, or a combination thereof.

The button 132 enables the user 18 to define what users can be identified as potential participants for photo advertisements created by the user 18. For example, the user 18 may indicate that friends of the user 18 in the social network maintained by the social networking service 42 can be used as potential participants for photo advertisements created by the user 18, other users within a defined degree of separation from the user 18 in the social network maintained by the social networking service 42 can be used as potential participants for photo advertisements created by the user 18, other users within a defined geographic distance from the user 18 can be used as potential participants for photo advertisements created by the user 18, and/or the like.

The button 134 enables the user 18 to define types of POIs or specific POIs at which the user 18 is to be prompted for check-in. The button 136 enables the user 18 to define types of POIs or specific POIs at which the check-in client 52 is to automatically initiate a photo check-in. Lastly, the button 138 enables the user 18 to define a maximum maturity rating for photo advertisements created by the user 18 or in which the user 18 is willing to participate. The maximum maturity rating may be used to select photo ad templates for photo advertisements created by the user 18. In addition, the maximum maturity rating may be used to automatically determine whether to automatically participate in photo advertisements being created by other users.

Figure 7:
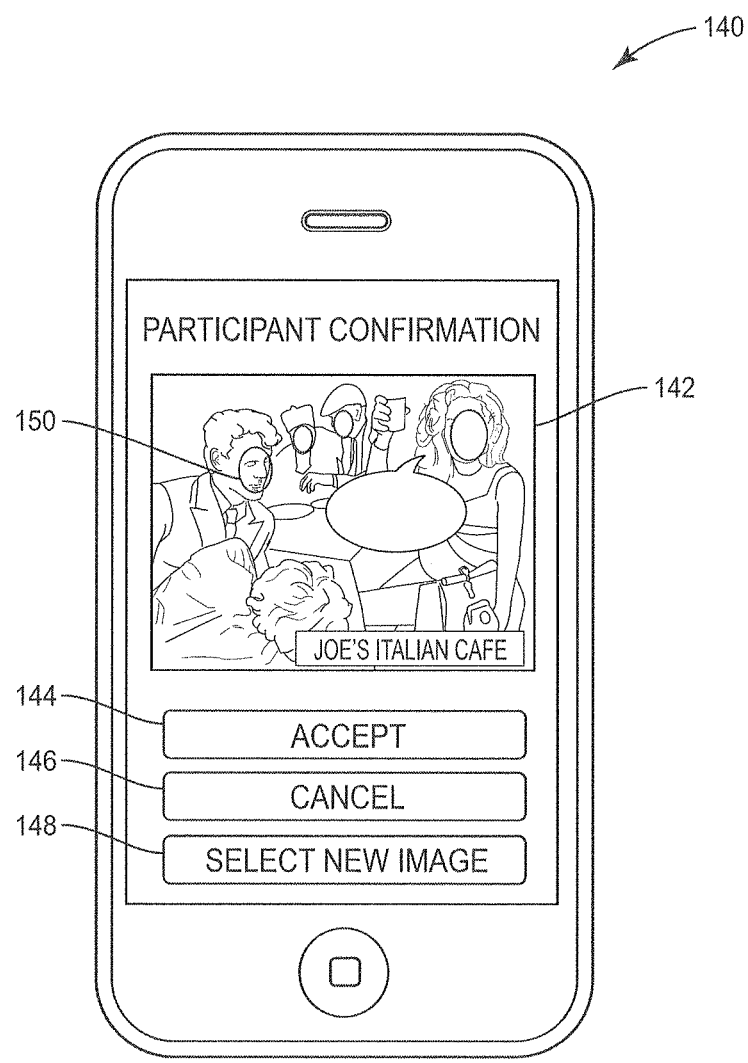
FIG. 7 illustrates an exemplary GUI that may be provided to a potential participant to obtain permission to be used in a photo advertisement.

FIG. 7 illustrates an exemplary GUI 140 that is presented to one of the potential participants selected for the photo advertisement being created via the GUI 82 of FIGS. 6A and 6B via the corresponding check-in client 52 or 56 according to one embodiment of the present disclosure. As illustrated, the GUI 140 includes a photo ad template display area 142, an accept button 144, a cancel button 146, and a select new image button 148. In this example, the filler image of the potential participant is inserted into a knockout 150 of the photo ad template. The potential participant can grant permission to be used as a participant in the knockout 150 of the photo ad template by selecting the accept button 144 or deny permission to be used as a participant in the knockout 150 of the photo ad template by selecting the cancel button 146. Alternatively, the potential participant may select a new filler image to be used for the potential participant by selecting the select new image button 148. Selecting a new filler image may also operate a grant of permission to be used as a participant for the knockout 150 of the photo ad template but only if the new filler image is used. Notably, the GUI 140 may provide additional or alternative features such as, for example, enabling the potential participant to select a different knockout in which the potential participant desires to be used.

Figure 8:
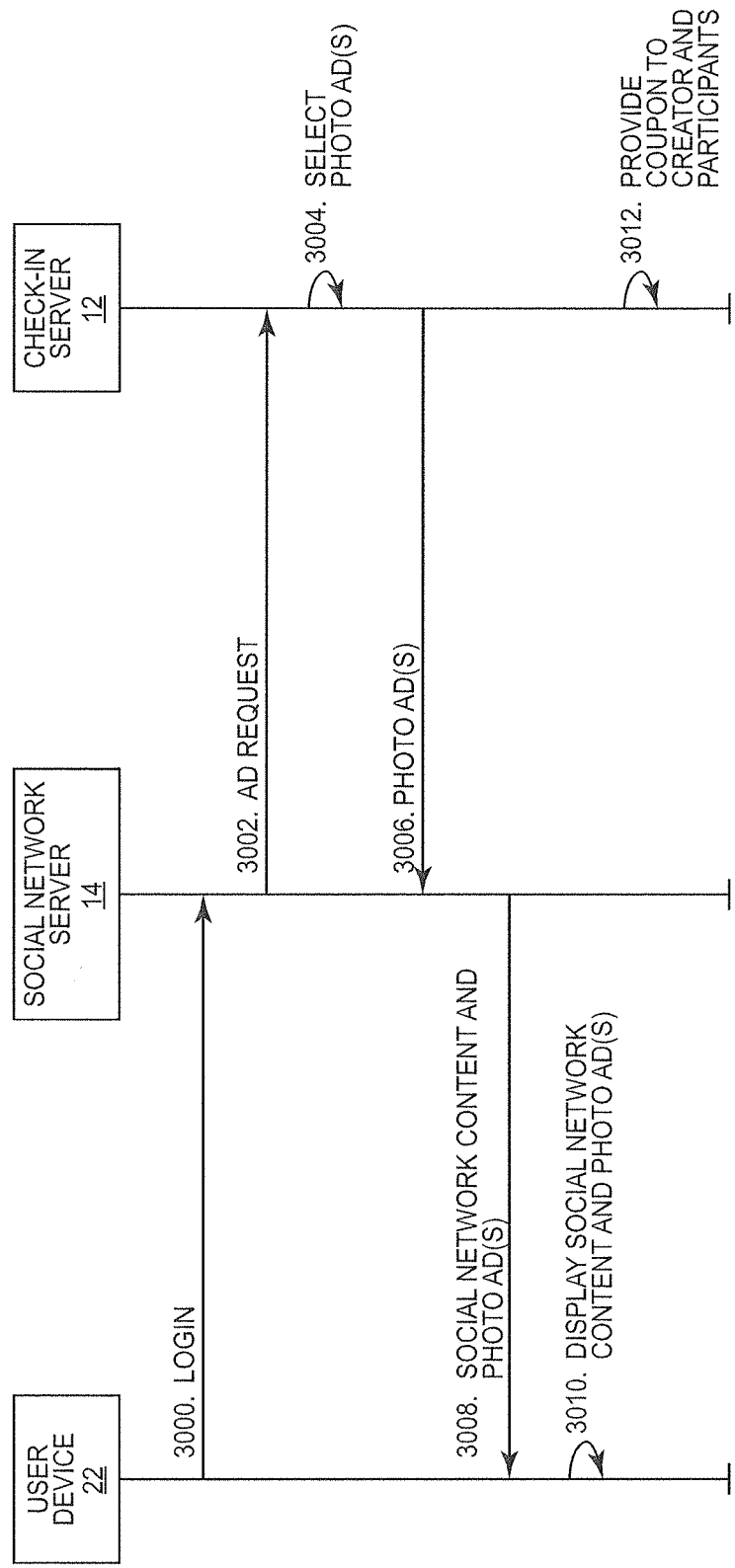
FIG. 8 illustrates the operation of the system of FIG. 1 to store and utilize photo advertisements generated by the users to serve ad requests according to one embodiment of the present disclosure.

FIG. 8 illustrates the operation of the ad function 32 of the check-in server 12 to serve ad requests according to one embodiment of the present disclosure. As discussed above, the photo ad repository 38 of the check-in server 12 stores photo advertisements created by registered users of the check-in server 12. In general, the ad function 32 utilizes the photo advertisements stored in the photo ad repository 38 to serve ad requests from entities such as, for example, the social networking service 42. More specifically, the user 24 of the user device 22 logs into the social networking service 42 hosted by the social network server 14 (step 3000). In response to the login or sometime while the user 24 is logged into the social networking service 42, the sponsored ad function 48 of the social networking service 42 hosted by the social network server 14 sends an ad request to the check-in server 12 (step 3002). Notably, while in this embodiment the social network server 14 requests advertisements, in an alternative embodiment, advertisements may be pushed to the social network server 14. The ad request includes target usage information. The target usage information generally includes information that describes a manner in which any photo advertisements returned in response to the request is to be used, information that describes a target of any photo advertisements returned in response to the request (i.e., the intended recipient), or both. More specifically, the target usage information may include one or more of the following: ad network type (e.g., television, cable, closed circuit, Internet, or the like), requestor information (e.g., website name, television station, or the like), and ID of the intended recipient (e.g., social network ID of the intended recipient). In this embodiment, since the social network server 14 is the requestor and the user 24 of the user device 22 is the intended recipient, the target usage information preferably includes an ID of the user 24 used for the social networking service 42. Using the ID of the user 24, the ad function 32 of the check-in server 12 is enabled to obtain information regarding the user 24 from the social networking service 42 such as, for example, the social graph of the user 24 and user profile information describing the user 24 (e.g., demographic information, interests, and/or the like).

In response to receiving the ad request, the ad function 32 of the check-in server 12 selects one or more photo advertisements from the photo ad repository 38 that satisfy the ad request (step 3004). More specifically, in this embodiment, for each photo advertisement, the metadata for the photo advertisement includes data that describes a check-in zone (e.g., a POI) to which the photo advertisement applies and creation information. In addition, metadata for each photo advertisement may define a class of users to which the photo advertisement may be shown, as defined by the creator of the photo advertisement. Using the target usage information in the ad request and the metadata for the photo advertisements, the ad function 32 is enabled to select one or more photo advertisements for the intended recipient. As an example, the one or more selected advertisements may include one or more photo advertisements created by a friend of the target user in the social network, one or more photo advertisements having at least one participant that is a friend of the target user in the social network, one or more photo advertisements having at least one participant that is within a defined degree of separation from the target user in the social network, and/or the like. In addition to social distance between the participants and the target user, the ad function 32 may consider other criteria when selecting the one or more photo advertisements such as, for example, geographic distance between the participants in the photo advertisement and the target user and a user profile of the target user (e.g., biographic information, demographic information, purchase history, web browsing history, and/or the like). Notably, information such as the social graph of the target user and the user profile of the target user, if obtained, may be cached by the ad function 32 for subsequent use.

In addition to selecting the one or more photo advertisements based on the metadata for the one or more photo advertisements and the target usage information, the ad function 32 may perform the selection further based on user preferences of the creators of the one or more photo advertisements, system-defined rules, advertiser-based restrictions, or a combination thereof. The user preferences of the creators may, for example, place restrictions on the usage of their photo advertisements. The restrictions may restrict the class of users to which the photo advertisements can be presented, a frequency of use of the photo advertisements, ad lifetimes for the photo advertisements, and/or the like. The system-defined rules may include, for example, ad lifetimes for the photo advertisements, restrictions on the frequency of use, and/or the like. Lastly, the advertiser-based restrictions may place restrictions on to whom the photo advertisements are presented based on criteria defined by the advertisers by whom or for whom the corresponding photo ad templates were created. For example, the advertiser-based restrictions may be based on social network distance from the advertiser in the social network, geographic distance from an advertised POI, and/or the like.

The ad function 32 of the check-in server 12 then returns the one or more photo advertisements selected in step 3004 to the social network server 14 (step 3006). In response, the social networking service 42 of the social network server 14 sends social network content and the one or more photo advertisements to the user device 22 (step 3008). In this embodiment, the social network content and the one or more photo advertisements are sent to the user device 22 in the form of a webpage. However, the present disclosure is not limited thereto. Notably, in one embodiment, where multiple participants may be identified for each photo well in the photo ad template, either the ad function 32 or the social networking service 42 performs the final selection of a single participant for each photo well based on, for example, social distance from the target user. For a photo well having multiple participants, the participant having the closest relationship to the target user in the social network may be selected. In addition or alternatively, a user profile matching technique may be used such that the participant having a user profile that most closely matches that of the target user is selected for the photo well when rendering the photo advertisement to the target user.

The social network client 58 of the user device 22 then presents the social network content and the one or more photo advertisements to the user 24 (step 3010). Lastly, the ad function 32 of the check-in server 12 provides a coupon or other benefit to the creator(s) and other participants in the one or more photo advertisements (step 3012). Notably, this benefit may be conferred when the one or more photo advertisements are returned to the social network server 14, when the one or more photo advertisements are returned to the user device 22, or when the one or more photo advertisements are displayed to the user 24. In addition or alternatively, a benefit may be conferred to the creator(s) and other participants if the user 24 selects one of the photo advertisements and/or if one of the photo advertisements results in a purchase of the advertised good or service by the user 24.

Figure 9:
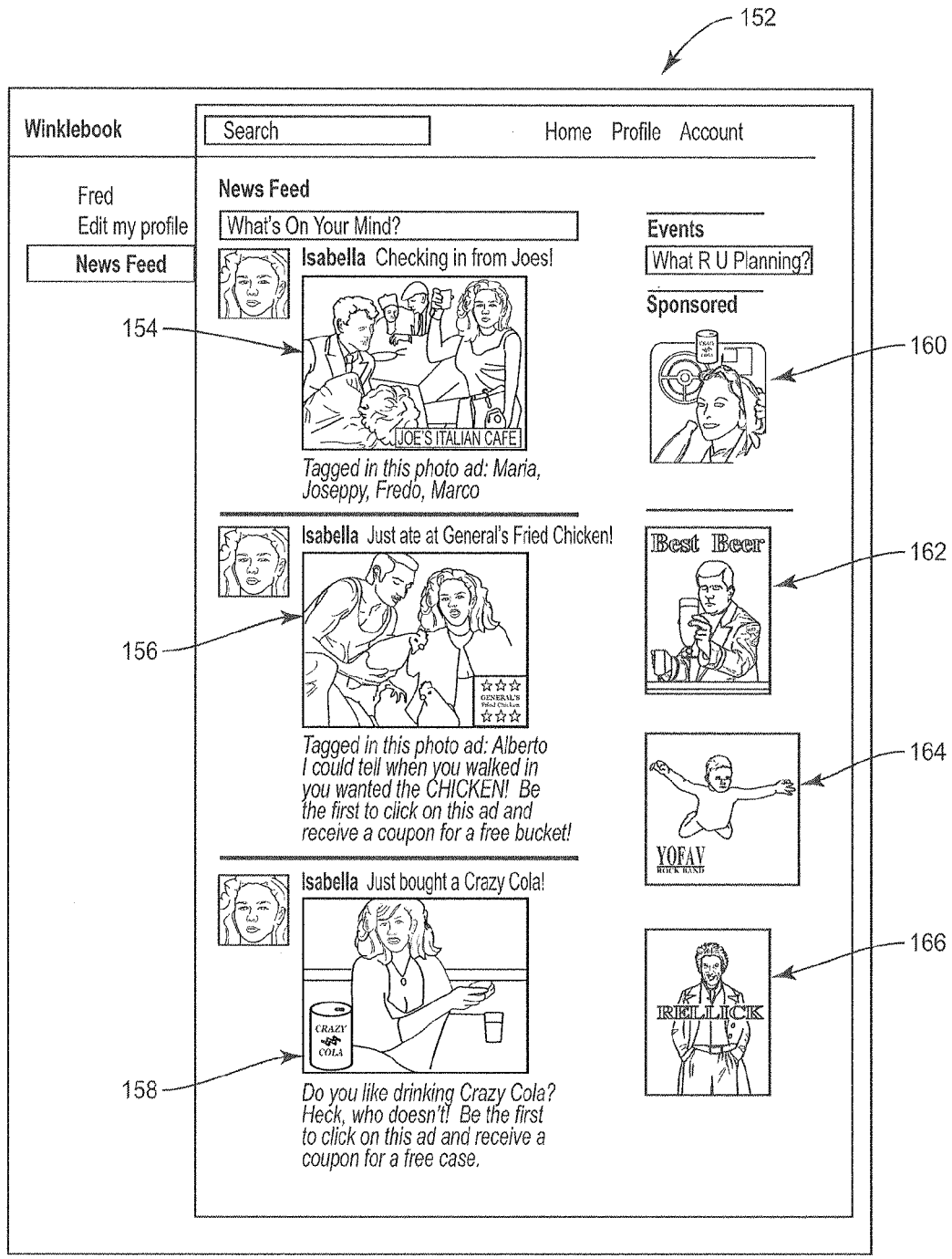
FIG. 9 illustrates an exemplary webpage presented to a user of the social networking service of FIG. 1 in which photo advertisements are presented as status updates from corresponding friends of the user and used as sponsored advertisements according to one embodiment of the present disclosure.

FIG. 9 illustrates an exemplary webpage 152 presented by the social networking service 42 according to one embodiment of the present disclosure. In this example, the webpage 152 is a homepage for the user 24, whose name is Fred. Further, the user 24 is friends with a user named Isabella. Isabella has created a number of photo check-ins 154 through 158 using the ad function 32 of the check-in server 12. As a result, the photo check-ins 154 through 158 are presented to Fred as a friend of Isabella. In addition, a number of sponsored advertisements 160 through 166 are also presented to Fred. The sponsored advertisements 160 through 166 are photo advertisements obtained from the ad function 32 of the check-in server 12 as described above with respect to FIG. 8.

The discussion above has focused primarily on the generation of photo advertisements with respect to check-ins. However, the present disclosure is not limited thereto. More specifically, the ad function 32 may be incorporated into any type of ad server that desires to enable users, such as but not limited to the users 18 and 24, to create photo advertisements that are relevant to the users. These photo advertisements may then be used to serve ad requests and, in some embodiments, used as status updates for the corresponding users. For example, the ad function 32 may be incorporated into an ad server that enables users to create photo advertisements for websites visited by the users, websites logged into by the users, goods purchased by the users, services purchased by the users, geographic locations of the users, events attended by the users, listening experiences of the users (e.g., songs, albums, or music artists listened to by the users), viewing experiences of the users (e.g., movies, television shows, or other videos watched by the users), and/or the like. For instance, a photo advertisement creation process may be triggered manually by a user or automatically by the ad function 32 upon detecting a triggering event (e.g., navigating to a website, logging into a website, purchasing an item, purchasing a service, being located at a particular geographic location, listening to a song, watching a television show or movie, or the like). Then, potential participants for a photo advertisement may be obtained. The ad function 32 may then obtain one or more applicable photo ad templates for the potential participants in a manner similar to that described above. Filler image(s) of the user and, in some embodiments, the additional participant(s) for the photo ad template are then matched to photo well(s) in at least one of the one or more ad templates using any suitable process to thereby provide one or more completed photo advertisements. One of the photo advertisements may be posted to the social networking service 42 as a status update of the user. In addition or alternatively, at least one of the one or more completed photo advertisements may be stored for subsequent use in serving ad requests from entities such as, for example, the social networking service 42.

Figure 10:
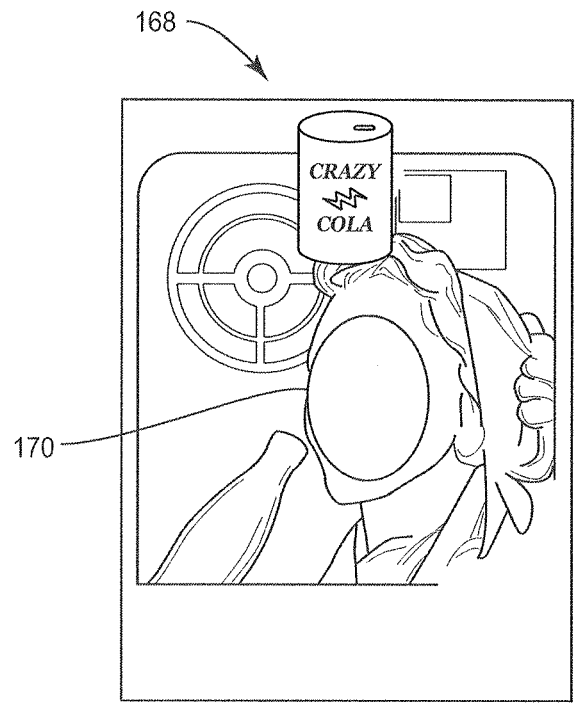
FIGS. 10 through 15 illustrate several additional embodiments of a photo ad template according to the present disclosure.
Figure 11:
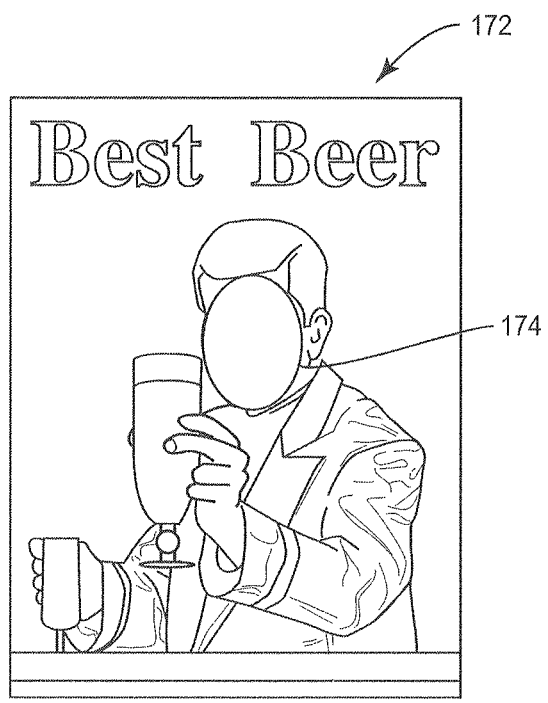

FIGS. 10 through 15 illustrate some exemplary photo ad templates that may be used to create photo advertisements according to some additional embodiments of the present disclosure. More specifically, FIG. 10 illustrates a photo ad template 168 that may be used to create photo advertisements for "Crazy Cola." For example, the user 18 may create a photo advertisement for Crazy Cola. The user 18 may manually initiate the photo ad creation process, or the photo ad creation process may be triggered automatically in response to the user 18 purchasing Crazy Cola. In response, a filler image of the user 18 is inserted into a knockout 170 in the photo ad template 168. The resulting photo advertisement may then be submitted to the social network server 14 either directly from the user device 16 of the user 18 or via the ad function 32 as a status update of the user 18. In addition or alternatively, the ad function 32 may store the photo advertisement for subsequent use in serving ad requests from entities such as, for example, the social networking service 42. FIG. 11 illustrates a similar photo ad template 172 including a knockout 174 that may be used to create photo advertisements for "Best Beer."

Figure 12:
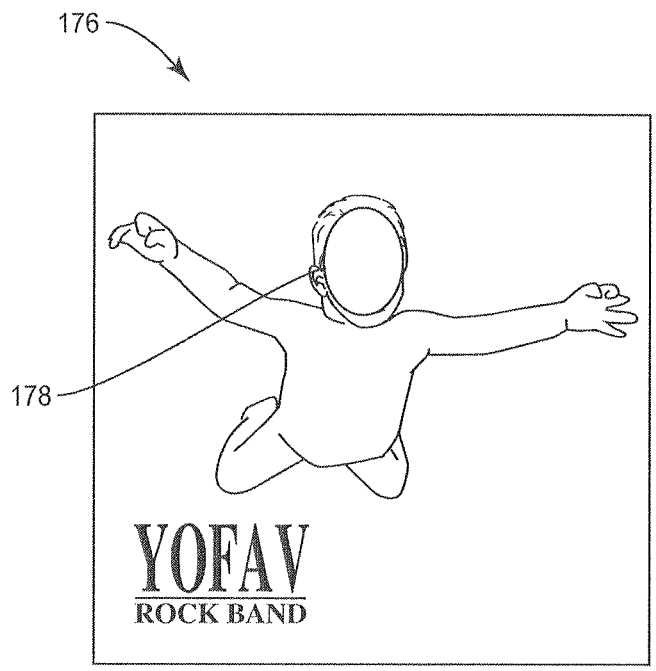
Figure 13:
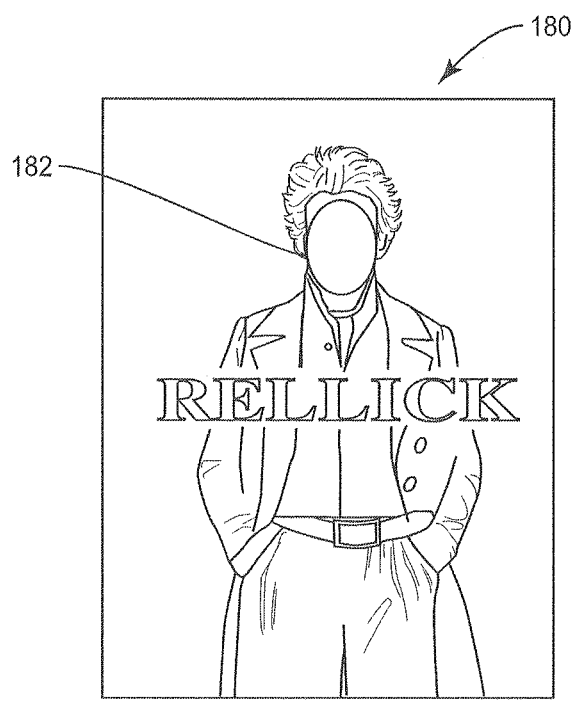

FIG. 12 illustrates a photo ad template 176 including a knockout 178 that may be used to create a photo advertisement for a music album. In this embodiment, the photo advertisement creation process may be manually initiated by the user. Alternatively, the photo creation process may be triggered by a purchase of the music album by the user. As another alternative, the photo ad creation process may be triggered in response to the user attending a concert of the corresponding music artist, in response to the user purchasing a ticket to a concert of the corresponding music artist, in response to the user listening to the music album utilizing a music player, or the like. As another alternative, the photo ad creation process may be triggered in response to the user listening to a song from the album a threshold number of times within a given time window, listening to all songs on the album a threshold number of times within a given time window, or the like. Note that the threshold value for number of times may be one, and the time window may be infinite. In a similar manner, FIG. 13 illustrates a photo ad template 180 including a knockout 182 that can be used to create photo advertisements for a movie called "RELLICK." In this embodiment, the photo advertisement creation process may be manually initiated by the user. Alternatively, the photo creation process may be triggered by a purchase of the movie by the user. As another alternative, the photo ad creation process may be triggered in response to the user viewing the movie at a movie theater, in response to the user purchasing a ticket to the movie, or the like. As another alternative, the photo ad creation process may be triggered in response to the user watching a video or a television show on internet TV. In one embodiment, the photo ad creation process is triggered based on the user watching all of the episodes in a season of a television show.

Figure 14:
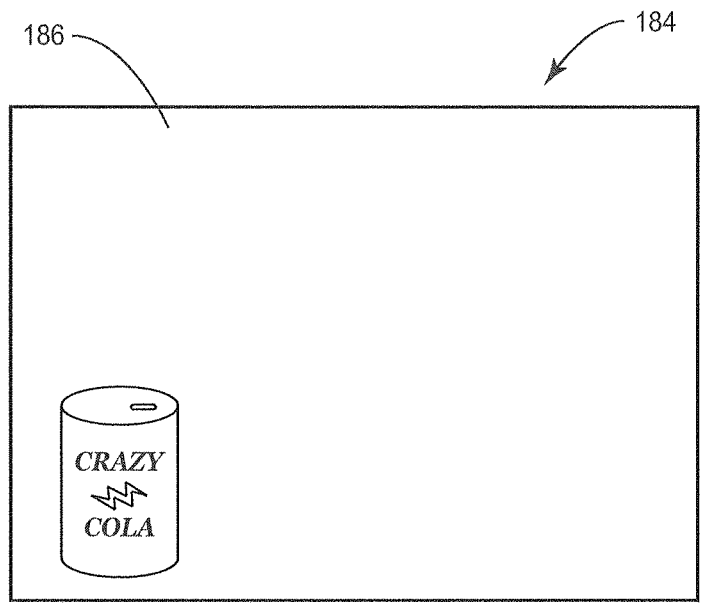
Figure 15:
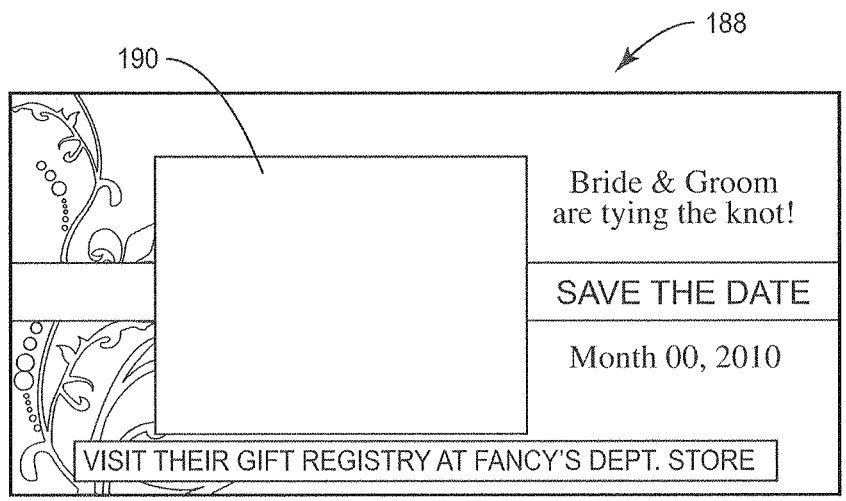

FIG. 14 illustrates a photo ad template 184 for Crazy Cola according to another embodiment of the present disclosure. In this embodiment, the photo ad template 184 includes a photo well 186 that is a photo well for a picture in general rather than a knockout. FIG. 15 illustrates a photo ad template 188 for Fancy's Department Store that includes a photo well 190. In this embodiment, the photo ad template 188 is in the form of an invitation to visit a couple's gift registry for a bridal shower. The photo ad template 188 may be used to create photo advertisements in response to registering at Fancy's Department Store. Again, the photo ad creation process may be initiated manually by the user or automatically in response to a triggering event such as completing a gift registry at Fancy's Department Store.

Figure 16:
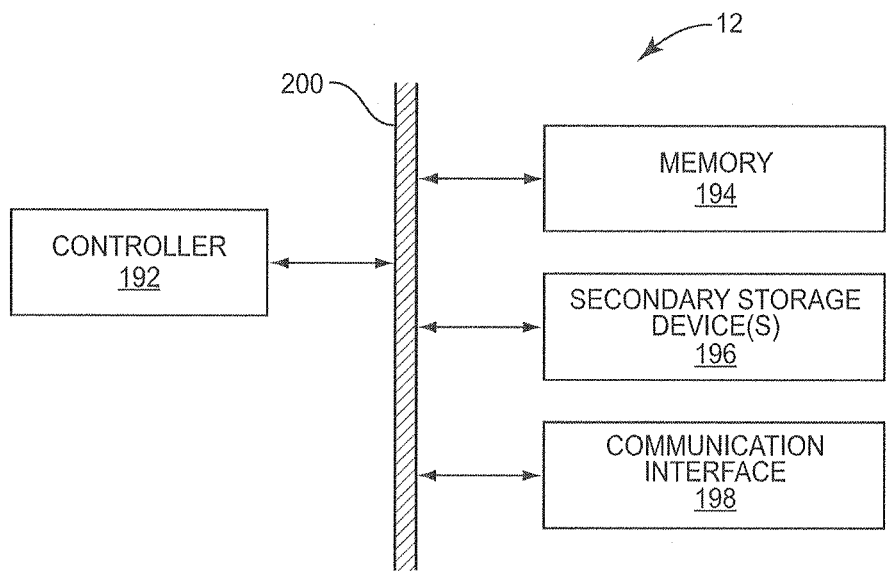
FIG. 16 is a block diagram of the check-in server of FIG. 1 according to one embodiment of the present disclosure.

FIG. 16 is a block diagram of the check-in server 12 according to one embodiment of the present disclosure. As illustrated, the check-in server 12 includes a controller 192 connected to memory 194, one or more secondary storage devices 196, and a communication interface 198 by a bus 200 or similar mechanism. The controller 192 is a microprocessor, digital Application Specific Integrated Circuit (ASIC), Field Programmable Gate Array (FPGA), or similar hardware component. In this embodiment, the controller 192 is a microprocessor, and the tracking function 28, the check-in function 30, and the ad function 32 (FIG. 1) are implemented in software and stored in the memory 194 for execution by the controller 192. Further, the repositories 34, 36, and 38 (FIG. 1) may be implemented in the one or more secondary storage devices 196. The secondary storage devices 196 are digital data storage devices such as, for example, one or more hard disk drives. The communication interface 198 is a wired or wireless communication interface that communicatively couples the check-in server 12 to the network 26 (FIG. 1). For example, the communication interface 198 may be an Ethernet interface, local wireless interface such as a wireless interface operating according to one of the suite of IEEE 802.11 standards, or the like.

Figure 17:
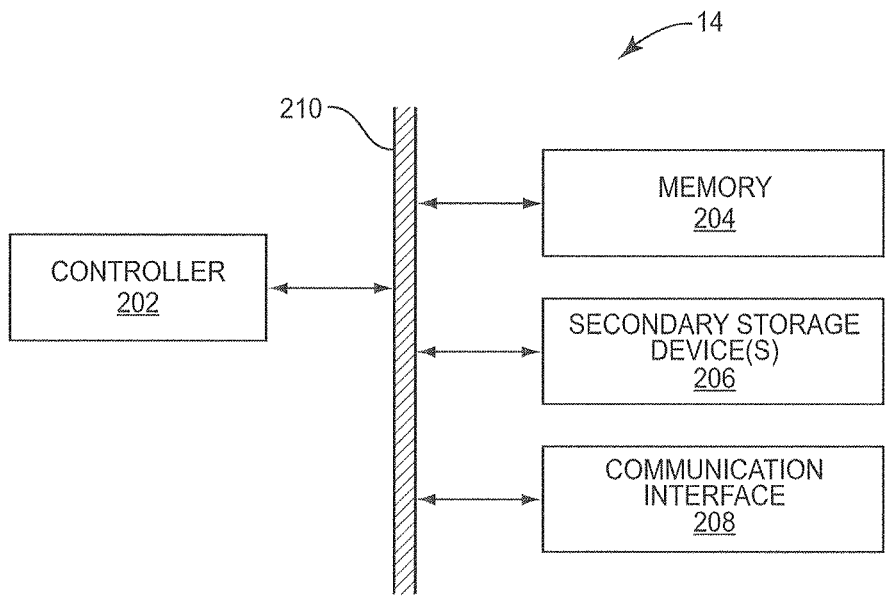
FIG. 17 is a block diagram of the social network server of FIG. 1 according to one embodiment of the present disclosure.

FIG. 17 is a block diagram of the social network server 14 according to one embodiment of the present disclosure. As illustrated, the social network server 14 includes a controller 202 connected to memory 204, one or more secondary storage devices 206, and a communication interface 208 by a bus 210 or similar mechanism. The controller 202 is a microprocessor, digital ASIC, FPGA, or similar hardware component. In this embodiment, the controller 202 is a microprocessor, and the social networking service 42 (FIG. 1) is implemented in software and stored in the memory 204 for execution by the controller 202. Further, the user accounts repository 44 (FIG. 1) may be implemented in the one or more secondary storage devices 206. The secondary storage devices 206 are digital data storage devices such as, for example, one or more hard disk drives. The communication interface 208 is a wired or wireless communication interface that communicatively couples the social network server 14 to the network 26 (FIG. 1). For example, the communication interface 208 may be an Ethernet interface, local wireless interface such as a wireless interface operating according to one of the suite of IEEE 802.11 standards, or the like.

Figure 18:
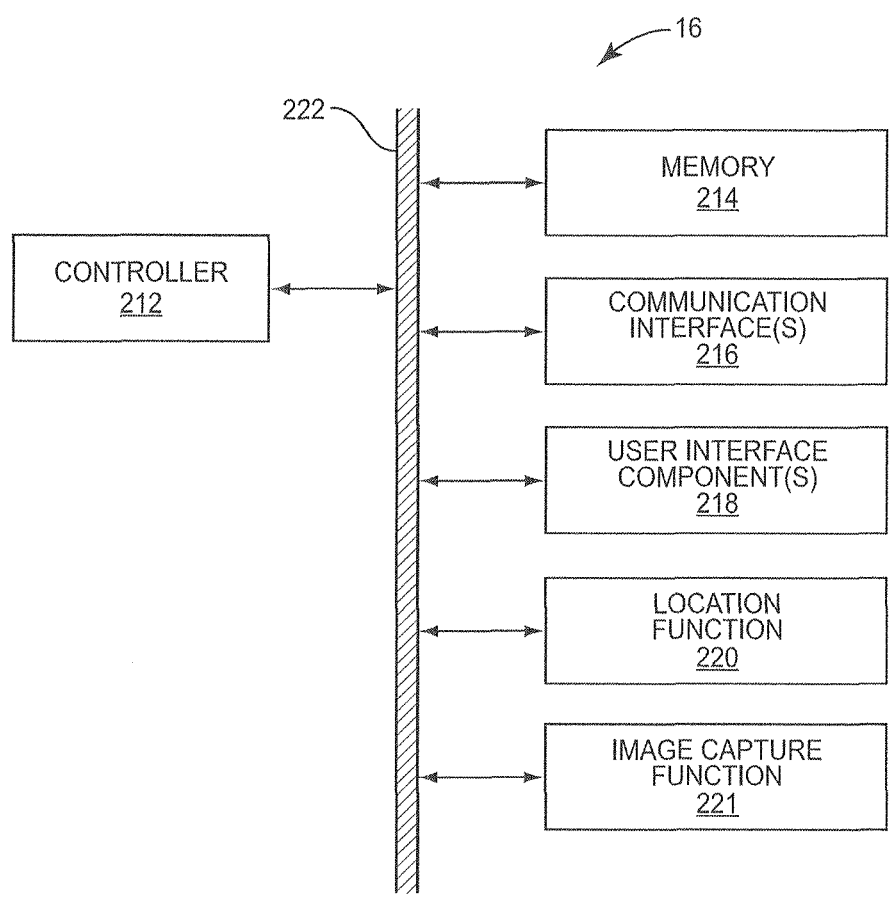
FIG. 18 is a block diagram of one of the user devices of FIG. 1 according to one embodiment of the present disclosure.

FIG. 18 is a block diagram of one of the user devices 16 according to one embodiment of the present disclosure. This discussion is equally applicable to the other user devices 16 and 22. As illustrated, the user device 16 includes a controller 212 connected to memory 214, one or more communication interfaces 216, one or more user interface components 218, a location function 220, and an image capture function 221 by a bus 222 or similar mechanism. The controller 212 is a microprocessor, digital ASIC, FPGA, or similar hardware component. In this embodiment, the controller 212 is a microprocessor, and the check-in client 52 and the social network client 54 are implemented in software and stored in the memory 214 for execution by the controller 212. The one or more communication interfaces 216 include a wireless communication interface that communicatively couples the user device 16 to the network 26 (FIG. 1). For example, the wireless interface may be a local wireless interface such as a wireless interface operating according to one of the suite of IEEE 802.11 standards, a mobile communications interface such as a cellular telecommunications interface (e.g., a 3G interface such as a GSM interface, a 4G interface such as a LTE interface, or the like), or the like. The one or more communication interfaces 216 may also include an NFC interface. The one or more user interface components 218 include, for example, a touchscreen, a display, one or more user input components (e.g., a keypad), a speaker, or the like, or any combination thereof. In this embodiment, the location function 220 is a hardware component such as, for example, a GPS receiver. The image capture function 221 is preferably a digital camera enabled to capture pictures to aid in the creation of the photo advertisements.

The systems and methods disclosed herein provide substantial opportunity for variation without departing from the spirit or scope of the present disclosure. For example, as discussed above, the ad function 32 is primarily described herein as being incorporated in the check-in server 12. However, the ad function 32 is not limited thereto. The ad function 32 may be incorporated in other types of ad servers as desired. As another example, while the check-in server 12 and notably the ad function 32 are illustrated in FIG. 1 as being separate from the social network server 14, the present disclosure is not limited thereto. For instance, the ad function 32 may be implemented in the social network server 14. In this case, a photo check-in and a status update based on a photo advertisement may be one and the same (i.e., the photo check-in is one type of status update). In another embodiment, the photo check-in process may be performed at a point-of-sale terminal of a venue, whereby a user may be requested to participate in a photo check-in while paying for purchased goods, and the user's image may be captured immediately, for instance by a camera integrated with the point-of-sale terminal. The advertised product may be identified from one or more products purchased by the user. The user's social network may be identified while processing the payment, and the user may even be encouraged to hold up the product in question for the photo capture.

In addition, in some of the embodiments described above, faces of participants are inserted into photo wells in a photo ad template to provide a resulting photo advertisement. However, it should be noted that the filler images are preferably adjusted (e.g., resized, cropped, or the like) in order to fit into the corresponding photo well. In an alternative embodiment, the filler images may be allowed to overflow or underflow the bounds of the photo well. Also, while the photo wells have been described and illustrated as voids in the photo ad template to be filled by the faces of select participants, the present disclosure is not limited thereto. Alternatively, the photo wells may be implemented as positions or areas in a photo forming the photo ad template at which filler images (e.g., faces) of select participants are to be overlaid. These positions or areas may be manually identified. Alternatively, these positions or areas may be programmatically identified using, for example, a face recognition process. Similarly, a face detection process may be used to extract the face of a participant from a filler image. The face of an original person appearing in the photo ad template may then be replaced with the face of the participant extracted from the filler image.

Those skilled in the art will recognize improvements and modifications to the preferred embodiments of the present disclosure. All such improvements and modifications are considered within the scope of the concepts disclosed herein and the claims that follow.

What is claimed is:

1. A computer-implemented method for generating a photo check-in for a user comprising:
    obtaining one or more photo ad templates associated with a check-in zone in which the user is located, each photo ad template of the one or more photo ad templates comprising one or more photo wells;
    obtaining a plurality of filler images representing a plurality of different participants identified for the photo advertisement;
    generating, by an electronic device, a photo advertisement based on the obtained one or more photo ad templates such that the obtained filler images are inserted into the one or more photo wells in the obtained one or more photo ad templates; and
    responsive to generating the photo advertisement, initiating a photo check-in that includes the photo advertisement for presentation with the photo check-in.

2. The method of claim 1 wherein the one or more participants comprise the user.

3. The method of claim 1 further comprising identifying a plurality of potential participants for the photo advertisement.

4. The method of claim 3 wherein obtaining the one or more photo ad templates comprises obtaining the one or more photo ad templates based on the check-in zone in which the user is located and participant information that describes the plurality of potential participants.

5. The method of claim 4 wherein the one or more photo wells of at least one of the one or more photo ad templates are one or more face knockouts of one or more persons appearing in the at least one of the one or more photo ad templates, and the participant information comprises a number of potential participants in the plurality of potential participants.

6. The method of claim 4 wherein the one or more photo wells of at least one of the one or more photo ad templates are one or more face knockouts of one or more persons appearing in the at least one of the one or more photo ad templates, and the participant information comprises a gender of each of the plurality of potential participants.

7. The method of claim 4 wherein the one or more photo wells of at least one of the one or more photo ad templates are one or more face knockouts of one or more persons appearing in the at least one of the one or more photo ad templates, and the participant information comprises age information for the plurality of potential participants.

8. The method of claim 4 wherein the one or more photo wells of at least one of the one or more photo ad templates are one or more face knockouts of one or more persons appearing in the at least one of the one or more photo ad templates, and the participant information comprises user profile information for the plurality of potential participants.

9. The method of claim 4 wherein the one or more photo wells of at least one of the one or more photo ad templates are one or more face knockouts of one or more persons appearing in the at least one of the one or more photo ad templates, and the participant information comprises user identifiers for the plurality of potential participants.

10. The method of claim 3 wherein identifying the plurality of potential participants for the photo advertisement comprises identifying other users in geographic proximity to the user, further wherein the plurality of potential participants comprise at least one of the other users in geographic proximity to the user.

11. The method of claim 10 wherein identifying the other users in geographic proximity to the user comprises identifying the other users in geographic proximity to the user using a wireless Near Field Communication (NFC) technique.

12. The method of claim 10 wherein identifying the other users in geographic proximity to the user comprises querying a remote location-based service to identify the other users in geographic proximity to the user.

13. The method of claim 3 wherein identifying the plurality of potential participants for the photo advertisement comprises identifying other users in social proximity to the user, further wherein the plurality of potential participants comprise at least one of the other users in social proximity to the user.

14. The method of claim 3 wherein identifying the plurality of potential participants for the photo advertisement comprises querying a social networking service to identity other users that are within a defined degree of separation from the user in a social network maintained by the social networking service and are in geographic proximity to the user, further wherein the plurality of potential participants comprise at least one of the other users identified by querying the social networking service.

15. The method of claim 1 wherein the one or more photo wells of the one of the one or more photo ad templates are one or more face knockouts of one or more persons appearing in the one of the one or more photo ad templates, and generating the photo advertisement comprises selecting one or more participants for the one or more face knockouts in the one of the one or more photo ad templates from a plurality of potential participants.

16. The method of claim 15 wherein selecting the one or more participants for the one or more face knockouts comprises, for each face knockout of at least one of the one or more face knockouts, selecting a participant for the face knockout from the plurality of potential participants based on a comparison of metadata associated with the face knockout and information that describes the plurality of potential participants.

17. The method of claim 1 wherein the steps of obtaining the one or more photo ad templates, generating the photo advertisement, and using the photo advertisement as the photo check-in for the user are performed by a user device of the user, and using the photo advertisement as the photo check-in for the user comprises submitting the photo advertisement to a check-in server.

18. The method of claim 17 wherein submitting the photo advertisement to the check-in server comprises sending the photo advertisement to the check-in server.

19. The method of claim 17 wherein submitting the photo advertisement to the check-in server comprises sending, to the check-in server, (a) information that identifies the one of the one or more photo ad templates, (b) the filler images of the one or more participants, and (c) information that links the filler images of the one or more participants to the one or more photo wells in the one of the one or more photo ad templates.

20. The method of claim 17 wherein submitting the photo advertisement to the check-in server comprises sending, to the check-in server, (a) information that identifies the one of the one or more photo ad templates, (b) information identifying the filler images of the one or more participants, and (c)

information that links the filler images of the one or more participants to the one or more photo wells in the one of the one or more photo ad templates.

21. A computing device comprising:
   a hardware communication interface; and
   a hardware controller associated with the communication interface and adapted to:
      obtain one or more photo ad templates associated with a check-in zone in which a user is located, each photo ad template of the one or more photo ad templates comprising one or more photo wells;
      obtain a plurality of filler images representing a plurality of different participants identified for the photo advertisement;
      generate a photo advertisement based on the obtained one or more photo ad templates such that the obtained filler images are inserted into the one or more photo wells in the obtained one or more photo ad templates; and
      responsive to generating the photo advertisement, initiate a photo check-in that includes the photo advertisement for presentation with the photo check-in.

22. The computing device of claim 21 wherein the computing device is a user device of the user, and, in order to use the photo advertisement as the photo check-in for the user, the controller is further adapted to submit the photo advertisement to a check-in server as the photo check-in for the user.

23. The computing device of claim 22 wherein, in order to submit the photo advertisement to the check-in server, the controller is further adapted to send the photo advertisement to the check-in server.

24. The computing device of claim 22 wherein, in order to submit the photo advertisement to the check-in server, the controller is further adapted to send, to the check-in server, (a) information that identifies the one of the one or more photo ad templates, (b) the filler images of the one or more participants, and (c) information that links the filler images of the one or more participants to the one or more photo wells in the one of the one or more photo ad templates.

25. The computing device of claim 22 wherein, in order to submit the photo advertisement to the check-in server, the controller is further adapted to send, to the check-in server, (a) information that identifies the one of the one or more photo ad templates, (b) information identifying the filler images of the one or more participants, and (c) information that links the filler images of the one or more participants to the one or more photo wells in the one of the one or more photo ad templates.

26. A non-transitory computer readable medium storing software for instructing a controller of a computing device to:
   obtain one or more photo ad templates associated with a check-in zone in which a user is located, each photo ad template of the one or more photo ad templates comprising one or more photo wells;
   obtain a plurality of filler images representing a plurality of different participants identified for the photo advertisement;
   generate a photo advertisement based on the obtained one or more photo ad templates such that the obtained filler images are inserted into the one or more photo wells in the obtained one or more photo ad templates; and
   responsive to generating the photo advertisement, initiate a photo check-in that includes the photo advertisement for presentation with the photo check-in.

27. A computer-implemented method comprising:
   receiving a photo ad template request from a user device of a user, the photo ad template request comprising information that identifies a check-in zone in which the user is located;
   selecting one or more photo ad templates that are associated with the check-in zone from a plurality of photo ad templates in response to the photo ad template request, each photo ad template of the one or more photo ad templates comprising one or more photo wells;
   returning the one or more photo ad templates to the user device;
   receiving photo advertisement data from the user device that defines a photo advertisement based on one of the one or more photo ad templates such that a filler image of a different one of one or more participants identified for the photo advertisement is inserted into each of the one or more photo wells in the one of the one or more photo ad templates to provide the photo advertisement; and
   responsive to receiving photo advertisement data, publishing the photo advertisement as a photo check-in for the user.

28. The method of claim 27 wherein the photo advertisement data is the photo advertisement.

29. The method of claim 27 wherein the photo advertisement data comprises: (a) information that identifies the one of the one or more photo ad templates, (b) the filler images of the one or more participants identified for the photo advertisement, and (c) information that links the filler images of the one or more participants identified for the photo advertisement to the one or more photo wells of the one of the one or more photo ad templates.

30. The method of claim 27 wherein the photo advertisement data comprises: (a) information that identifies the one of the one or more photo ad templates, (b) information that identifies the filler images of the one or more participants identified for the photo advertisement, and (c) information that links the filler images of the one or more participants identified for the photo advertisement to the one or more photo wells of the one of the one or more photo ad templates.

31. The method of claim 27 wherein the photo ad template request further comprises participant information that identifies one or more potential participants identified for the photo advertisement, and selecting the one or more photo ad templates comprises selecting the one or more photo ad templates based on the check-in zone and the participant information.

32. The method of claim 27 further comprising sending the photo advertisement to a social networking service as a status update of the user.

33. The method of claim 27 further comprising:
   storing the photo advertisement;
   receiving an ad request from a requestor; and
   providing the photo advertisement to the requestor in response to the ad request.

34. A server computer comprising:
   a hardware communication interface; and
   a hardware controller associated with the communication interface and adapted to:
      receive a photo ad template request from a user device of a user, the photo ad template request comprising information that identifies a check-in zone in which the user is located;
      select one or more photo ad templates that are associated with the check-in zone from a plurality of photo ad templates in response to the photo ad template request, each photo ad template of the one or more photo ad templates comprising one or more photo wells;

return the one or more photo ad templates to the user device;

receive photo advertisement data from the user device that defines a photo advertisement based on one of the one or more photo ad templates such that a filler image of a different one of one or more participants identified for the photo advertisement is inserted into each of the one or more photo wells in the one of the one or more photo ad templates to provide the photo advertisement; and responsive to receiving the photo advertisement data, publish the photo advertisement as a photo check-in for the user.

35. A non-transitory computer readable medium storing software for instructing a controller of a computing device to:

receive a photo ad template request from a user device of a user, the photo ad template request comprising information that identifies a check-in zone in which the user is located;

select one or more photo ad templates that are associated with the check-in zone from a plurality of photo ad templates in response to the photo ad template request, each photo ad template of the one or more photo ad templates comprising one or more photo wells;

return the one or more photo ad templates to the user device;

receive photo advertisement data from the user device that defines a photo advertisement based on one of the one or more photo ad templates such that a filler image of a different one of one or more participants identified for the photo advertisement is inserted into each of the one or more photo wells in the one of the one or more photo ad templates to provide the photo advertisement; and responsive to receiving the photo advertisement data, publish the photo advertisement as a photo check-in for the user.

* * * * *